US 8,444,048 B1

(12) United States Patent
Nidamarthi et al.

(10) Patent No.: US 8,444,048 B1
(45) Date of Patent: May 21, 2013

(54) SYSTEM AND METHOD FOR PROVIDING TRANSACTION-RELATED COMMUNICATION USING MACHINE-READABLE ENCODED INFORMATION

(75) Inventors: Lakshmi S. Nidamarthi, Issaquah, WA (US); Jerry Wong, Seattle, WA (US); Hardik B. Doshi, Seattle, WA (US); Charley Ames, Seattle, WA (US); Brock A. Judkins, Seattle, WA (US); Gregory D. Lewis, Bremerton, WA (US); Chris H. Li, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 132 days.

(21) Appl. No.: 12/978,264

(22) Filed: Dec. 23, 2010

(51) Int. Cl.
*G06K 5/00* (2006.01)

(52) U.S. Cl.
USPC .......................................... 235/375; 235/380

(58) Field of Classification Search
USPC .......................... 235/375, 380, 382, 492, 486
See application file for complete search history.

(56) References Cited

U.S. PATENT DOCUMENTS

| | | | |
|---|---|---|---|
| 2010/0268659 A1* | 10/2010 | Zimberoff et al. | 705/336 |
| 2010/0274655 A1 | 10/2010 | Postrel | |
| 2011/0153403 A1 | 6/2011 | Postrel | |
| 2011/0178889 A1 | 7/2011 | Abraham et al. | |
| 2012/0011025 A1* | 1/2012 | Hunt | 705/26.41 |
| 2012/0150611 A1* | 6/2012 | Isaacson et al. | 705/14.27 |

OTHER PUBLICATIONS

U.S. Appl. No. 12/978,258, filed Dec. 23, 2012, Lakshmi S. Nidamarthi.
U.S. Appl. No. 12/978,263, filed Dec. 23, 2012, Lakshmi S. Nidamarthi.

* cited by examiner

*Primary Examiner* — Thien M Le
(74) *Attorney, Agent, or Firm* — Robert C. Kowert; Meyertons, Hood, Kivlin, Kowert & Goetzel, P.C.

(57) ABSTRACT

A computer generates encoded information to associate a physical package to a transaction. The transaction comprises an order for one or more items to be shipped in the package. The encoded information is provided for inclusion in a machine-readable representation of the encoded information for shipping with the physical package. Subsequent to delivery of the physical package to a recipient, recipient reaction information containing the encoded information obtained from the machine-readable representation is received over a network. The encoded information is used to associate the recipient reaction information to a record for the transaction.

29 Claims, 18 Drawing Sheets

SYSTEM AND METHOD FOR PROVIDING TRANSACTION-RELATED COMMUNICATION USING MACHINE-READABLE ENCODED INFORMATION

REFERENCE TO RELATED APPLICATION

This application is related to the subject matter of co-pending U.S. patent application Ser. No. 12/978,258 and No. 12/978,263 (now issued U.S. Pat. No. 8,413,882, filed on even date herewith, which are incorporated by reference herein in their entirety and for all purposes.

BACKGROUND

Electronic commerce, colloquially known as e-commerce or e-business, includes the buying and selling of products or services over electronic systems such as the Internet and other computer networks. While a significant percentage of the growth in e-commerce in recent years has involved virtual goods and services, most electronic commerce still involves fulfillment of an order through the transportation of physical items in some way. In the majority of e-commerce transactions, the purchase transaction is ordered or agreed electronically and interactively in real-time and subsequently completed with the delivery of a physical package containing goods.

The amount of trade conducted electronically has grown rapidly with widespread Internet usage and has further increased with the proliferation of mobile computing devices capable of accessing the Internet. Such mobile computing devices include laptop computers, tablet computers, and handheld telephones. Expansion of the capabilities of such mobile devices has increased opportunities for the user of a mobile device to participate in electronic commerce.

Figure 1A:
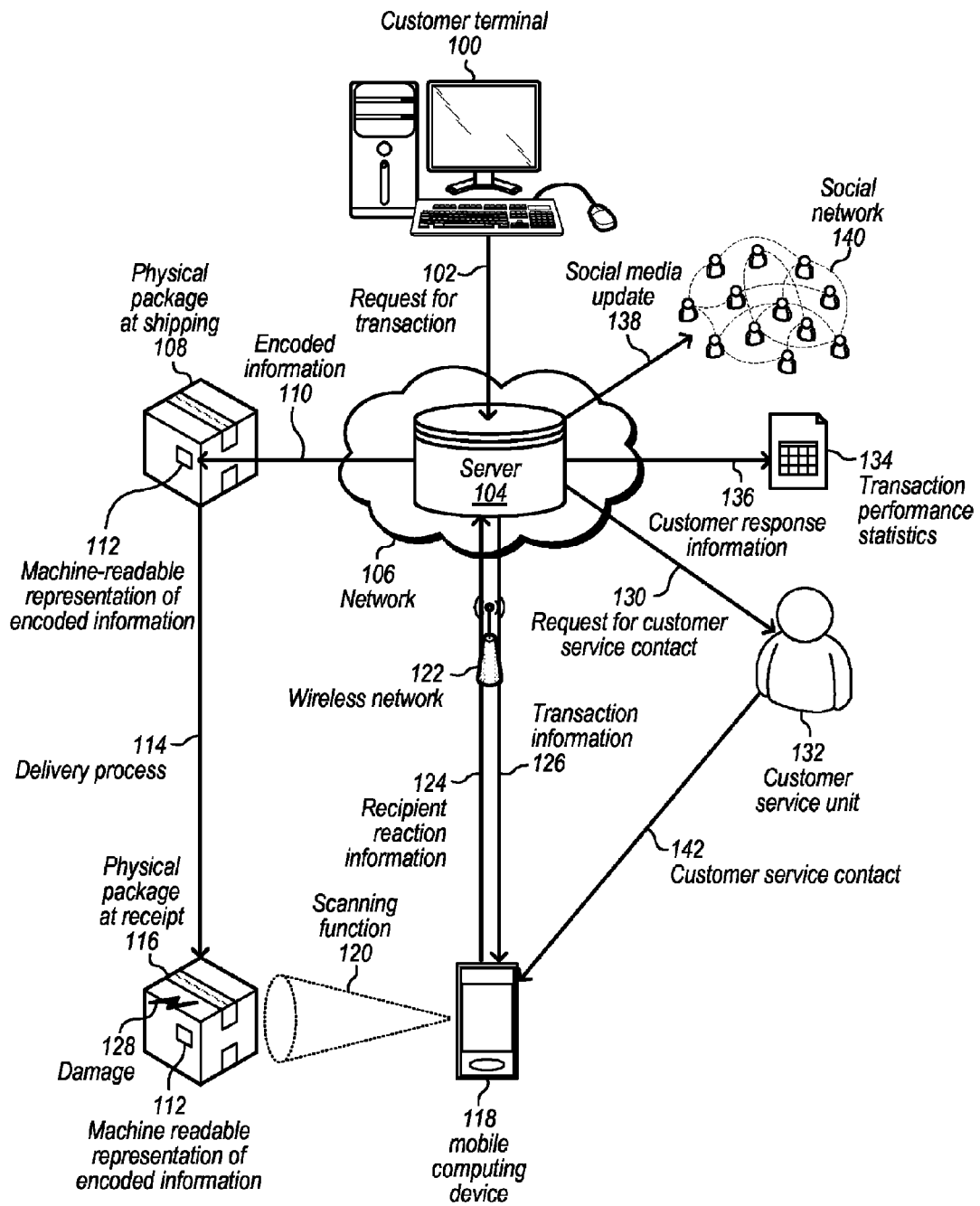
FIG. 1A illustrates a network including an example embodiment of a system that may be configured to implement transaction-related communication using machine-readable encoded information.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction to Transaction-Related Communication Using Machine-Readable Encoded Information In one embodiment, physical packages are equipped with machine-readable representations of encoded information. The encoded information is used to associate a physical package with a transaction or an electronic representation of a transaction that is stored in a computer-readable medium. Upon or subsequent to receipt of the physical package by a recipient, a mobile computing device located with the recipient reads a machine-readable representation of the encoded information and uses the encoded information to communicate recipient reaction information to a server. In some embodiments, the transaction comprises an order for one or more items to be shipped in the physical package. Subsequent to delivery of the physical package to a recipient, a server receives over a network the recipient reaction information containing the encoded information obtained from the machine-readable representation. The server uses the encoded information to associate the recipient reaction information to the transaction or a record for the transaction that is stored in a computer-readable medium.

In some embodiments, the server provides transaction information to the mobile computing device for execution of additional functions related to the transaction. Examples of such functions include the gathering of feedback from the recipient, customer service interactions with the recipient, or facilitation of return of items in the physical package to a seller, social media interactions related to the transaction, and delivery of messages related to the transaction or to the contents of the physical package.

In one embodiment, the server generates encoded information to associate the physical package to the transaction. The encoded information is provided for inclusion in a machine-readable representation of the encoded information for shipping with the physical package. The encoded information takes the form of a uniform resource locator (URL) for requesting interaction with a server. The URL can include identifying information, such as a serial number identifier, to associate a particular transaction with a particular physical package.

In such an embodiment, the machine-readable representation of the encoded information takes the form of a Quick Response (QR) code or other matrix (two-dimensional) barcode readable by a scanner, such as the camera of a mobile phone or other mobile computing device programmed to identify and process matrix barcodes. In alternative embodiments, the machine-readable representation of the encoded information takes the form of a radio-frequency identification (RFID) readable by a radio frequency interface of a mobile phone or other mobile computing device programmed to identify and process the RFID. In alternative embodiments, other information, such as the contents of a package, can be included in the encoded information.

In some embodiments, an application executing on a mobile computing device receives encoded information from a physical package by invoking a scanning function of the mobile computing device to read a machine-readable representation of the encoded information. As discussed above, in some embodiments, the scanning function takes the form of a QR code reader detecting and deciphering a QR code in an image captured by a camera of the mobile device. In alternative embodiments, the scanning function takes the form of an RFID reader detecting and deciphering an RFID. The encoded information associates the physical package with a transaction.

The mobile computing device transmits, using the encoded information, an item of recipient reaction information to a server at a network location. In one embodiment, the encoded information takes the form of a uniform resource locator (URL) for requesting interaction with a server. The URL can include identifying information, such as a serial number identifier, to associate a particular transaction with a particular physical package. In some embodiments, the machine-readable representation of the encoded information can include other information about the transaction or the physical package, such as a data structure of package contents. In some embodiments, multiple QR codes may be provided on a single package, and a first QR code can be selected as an indication of recipient satisfaction with the package while a second QR code can be selected as an indication of dissatisfaction.

In some embodiments, the application executing on the mobile device deciphers the URL and reading the URL triggers execution of a purpose-built application for providing transaction-related communication using machine-readable encoded information. In other embodiments, reading the URL triggers invocation of a generic browser, which requests the file indicated by the URL and initiates a worldwide web (WWW) session with the server responding to requests pointed to the URL. In some embodiments, authentication and security functions are provided.

In some embodiments, the mobile computing device receives from the server an item of transaction information associated with the transaction. The item of transaction information is usable by the application to perform a user interaction function related to the transaction. The mobile computing device performs the user interaction function.

In some embodiments, the user interaction function is one of a set of additional functions related to the transaction. Examples of such functions include the gathering of feedback from the recipient, customer service interactions with the recipient and package return processing, social media interactions related to the transaction, and delivery of messages related to the transaction.

Figure 1B:
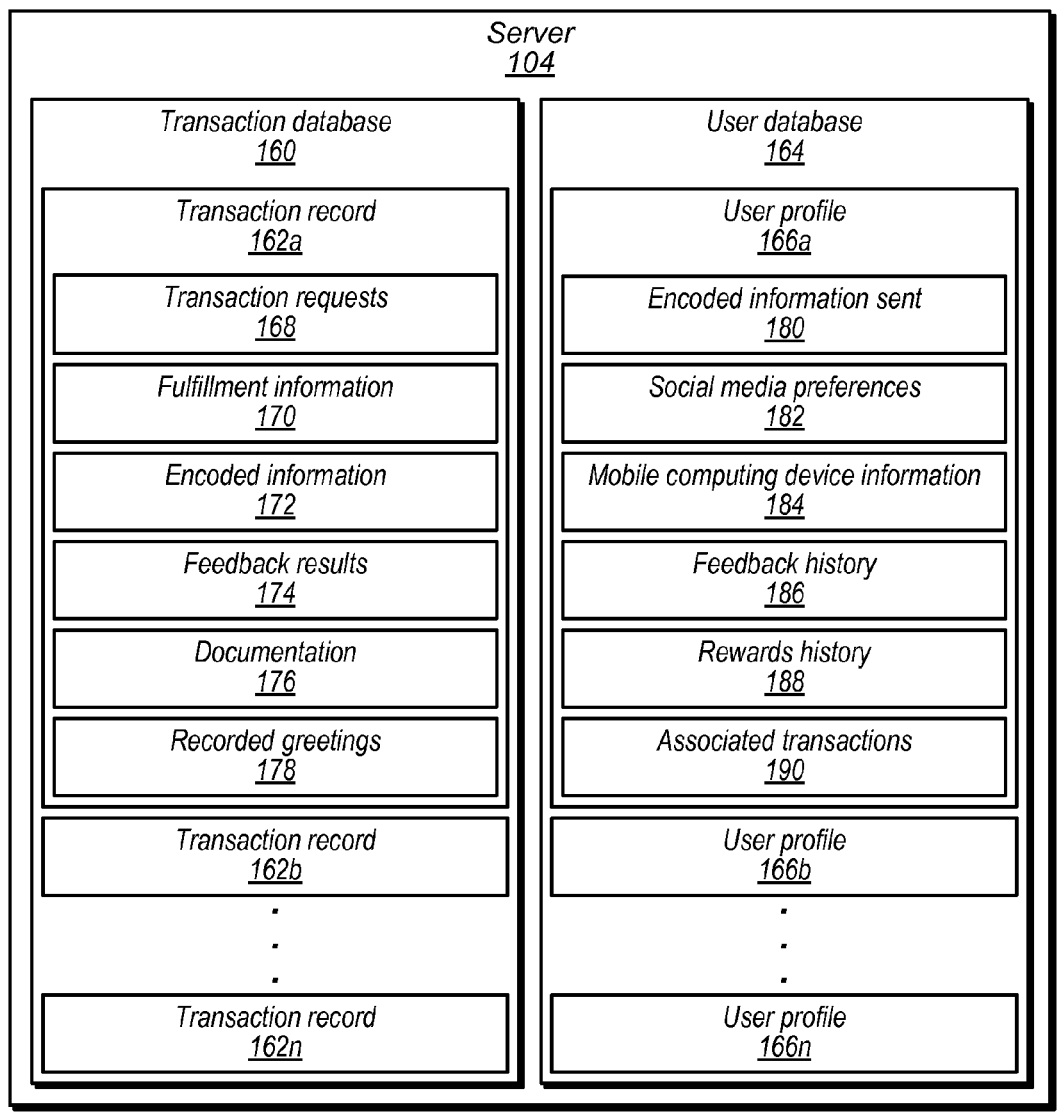
FIG. 1B illustrates an example embodiment of a set of data structures that may be configured to implement transaction-related communication using machine-readable encoded information.

Example Systems Capable of Providing Transaction-Related Communication Using Machine-Readable Encoded Information FIGS. 1A-1B illustrate examples of systems and system components usable in embodiments of methods and systems for providing transaction-related communication using a machine-readable medium. Specifically, FIG. 1A illustrates a network including an example embodiment of a system that may be configured to implement transaction-related communication using machine-readable encoded information. In an example e-commerce transaction, a customer using a customer terminal 100 electronically sends a request for transaction 102 to a server 104 over a network 106. Though a stationary customer terminal 100 is portrayed in FIG. 1, one skilled in the art will realize, in light of having read the present disclosure, that any computing device, such as a handheld tablet, mobile phone, or other mobile computing device, may be substituted for stationary customer terminal 100 using a wireless network 122, described below. Likewise, a customer need not have physical access to customer terminal 100 to create request for transaction 102. One skilled in the art will realize that, in some embodiments, request for transaction 102 may be created by a customer interacting directly with server 104, for example by speaking voice commands to server 104 over a telephone connection using an interactive voice response (IVR) system. As will be readily understood by one of skill in the art in light of having read the present disclosure, server 104 may take the form of a discrete computing system or will, in some embodiments, take the form of a computing system including multiple servers or components distributed throughout network 106, as is the case in "cloud computing" embodiments. As used in the present description and claims, use of the term server includes embodiments in which multiple servers or components distributed throughout network perform the functions described herein. Likewise, as used herein, use of the term computer includes embodiments in which multiple computers or components distributed throughout network perform the functions described herein.

In the example portrayed in FIG. 1A, request for transaction 102 includes a request that a physical package be shipped to a recipient. FIG. 1 includes a physical package at shipping 108. Prior to shipping to a recipient, server 104 generates encoded information 110 to associate physical package at shipping 108 with the transaction requested in request for transaction 102 and provides encoded information 110 for inclusion in a machine-readable representation of encoded information 112 for shipping with physical package at shipping 108. In one embodiment, encoded information 110 is delivered as a uniform resource locator (URL) for requesting interaction with server 104. The URL can include identifying information, such as a serial number identifier, to associate the transaction requested in request for transaction 102 with physical package at shipping 108. In one embodiment, machine-readable representation of encoded information 112 is a label with a printed QR code representing the URL. A QR code format for use as a machine-readable medium for encoded information is discussed below with respect to FIG. 4A. In alternative embodiments, machine-readable representation of encoded information 112 is an RFID chip that discharges a signal representing the URL. In some embodiments, machine-readable representation of encoded information 112 includes additional information, such as a listing of the contents of physical package at shipping 108.

After a delivery process 114, such as transport with a commercial delivery service, a recipient possesses a physical package at receipt 116. A recipient of physical package at receipt 116 uses an application executing on a mobile computing device 118 to invoke a scanning function 120 of mobile computing device 118. Scanning function 120 detects machine-readable representation of encoded information 112 on physical package at receipt 116. In some embodiments, scanning function 120 of mobile computing device 118 is implemented as an application for capturing an image of reflected ambient light with a camera of mobile device 118 and decoding content of QR code or other 2-dimensional matrix barcode (such as Aztec™ barcode by Welch Allyn, Inc. or other data matrix bar code).

In other embodiments, rather than a camera of mobile device capturing an image of reflected ambient light, a light source on mobile device 118 may be configured to emit and capture light (either within the visible spectrum or outside of the visible spectrum) to take advantage of particular reflective properties (of inks or embossing) used in machine-readable representation of encoded information 112 on physical package at receipt 116. In still other alternative embodiments, scanning function 120 of mobile device 118 may be a radio-frequency signal scanner configured to read a radio frequency signal of an RFID tag used as machine-readable representation of encoded information 112 on physical package at receipt 116. In such embodiments, machine-readable representation of encoded information 112 on physical package at receipt 116 may be self-powered to emit a radio frequency signal, or machine-readable representation of encoded information 112 on physical package at receipt 116 may be configured to emit an induced radio frequency signal in response to receipt of a radio frequency signal emitted by scanning function 120 of mobile computing device 118.

Mobile device 118 transmits over a wireless network 122 to server 104 on network 106 recipient reaction information 124 containing encoded information 110 retrieved from machine-readable representation of encoded information 112 by scanning function 120 of mobile computing device 118. Mobile computing device 118 receives over wireless network 122 from server 104 an item of transaction information 126 associated with the transaction requested in transaction request 102. Wireless network 122 may allow connection by and communication with mobile computing device 118 using any suitable network protocol, including but not limited to wireless telephony networks such as Global System for Mobile Communications (GSM) networks and wireless data networks such as wireless data networks conforming to the Institute for Electrical and Electronics Engineers (IEEE) 802.11x standards.

Item of transaction information 126 is usable by an application executing on mobile computing device 118 to perform a user interaction function related to the transaction requested in transaction request 102. Mobile computing device 118 performs the user interaction function. A wide variety of user interaction functions are supported by the embodiments discussed herein. While certain user interaction functions are explicitly discussed, one of skill in the art will, in light of having read the present disclosure, readily realize that additional user interaction functions not discussed herein are within the scope and intent of the discussed embodiments.

While a singular item of item of transaction information 126 is discussed herein, one of skill in the art will also readily realize, in light of having read the present disclosure, that references to an item of recipient reaction information 124 or an item of transaction information 126 describe one or more items of recipient reaction information 124 or one or more items of transaction information 126, respectively. Varying embodiments will rely on varying quantities of one or more items of recipient reaction information 124 or one or more items of transaction information 126 to perform varying functions without departing from the scope of the present disclosure. Likewise, transmission of one or more items of recipient reaction information 124 or one or more items of transaction information 126 over network 104 and wireless network 122 may imply transmission over a complex fabric of network components that will vary between embodiments without departing from the scope of the present disclosure.

The user interaction function performed by mobile computing device 118 can take many forms, as discussed below, without departing from the scope of the present disclosure, and multiple transmissions of the content of recipient reaction information 124 and transaction information 126 between mobile computing device 118 and server 104 may occur, in which recipient reaction information 124 and transaction information 126 will vary.

As examples of user interaction functions that can be performed by mobile computing device 118, customer service requests, social media updates, and customer service feedback are illustrated in FIG. 1. One of skill in the art will quickly recognize, in light of having read the present disclosure, that many other user interaction functions may be performed by mobile computing device 118 without departing from the scope and intent of the present disclosure.

User interaction functions that can be performed by mobile computing device 118 include sending a damage report or gathering feedback about recipient satisfaction with physical package at receipt 116. In such an embodiment, recipient reaction information 124 includes an indication of recipient satisfaction and can, at the option of the user, include detailed information such as a photograph taken with a camera of mobile computing device 118, showing damage 128 on physical package at receipt 116. In some embodiments, an indication of recipient satisfaction may be embodied as the scanning of a first QR code if the user is satisfied or a second QR code if the user is dissatisfied. An example display of multiple QR codes for facilitating customer feedback is discussed below with respect to FIG. 4B. Some embodiments also allow a user to enter narrative text describing satisfaction or dissatisfaction with physical package at receipt 116 or to provide an oral description using a sound recording function of mobile device 118. An interface for facilitating user feedback related to the transaction is discussed below with respect to FIG. 9.

User interaction functions that can be performed by mobile computing device 118 also include displaying to a user a listing or other data structure, such as a photograph, informing the user of the contents of physical package at receipt 116. Such a data structure can be sent by server 104 as part of transaction information 126. An interface for providing to the user a listing or other data structure, such as a photograph, informing the user of the contents of physical package at receipt 116 is discussed below with respect to FIG. 5 and FIG. 6. In alternative embodiments, a data structure listing out contents of physical package at receipt 108 can be included in machine-readable representation of encoded information 112 and can be read directly from machine-readable representation of encoded information 112 by scanning function 120 of mobile device 118.

Additionally, user interaction functions that can be performed by mobile computing device 118 include displaying to a user a recorded message related to the transaction. In one embodiment, such a recorded message can be created by a customer using customer terminal 100 and stored on server 104 until being transmitted by server 104 as part of transaction information 126 for display to a user of mobile computing device 118. Such a recorded message can be a text message, audio file, video file, image file or markup document prepared by a customer using customer terminal 100. Alternatively, such a recorded message may be documentation associated with the contents of physical package at receipt 116. Such documentation may be embodied as a text message, audio file, video file, image file or markup document prepared by a supplier of the contents of physical package at receipt 116 for display to a recipient.

Alternatively, such a recorded message can indicate that a user has earned a reward through a reward program. A reward earned through a reward program can include recognition on a social network sent as a social media update, such as an "early adopter" designation or badge on a social media website. A reward earned through a reward program can also include a discount on subsequent purchases, and a recorded message may be used to inform the user of mobile computing device 118 of the discount. An interface for providing to the user a recorded message related to the transaction is discussed below with respect to FIG. 7. In some embodiments, a data structure containing the recorded message can be included in machine-readable representation of encoded information 112 and can be read directly from machine-readable representation of encoded information 112 by scanning function 120 of mobile device 118.

User interaction functions that can be performed by mobile computing device 118 further include sending a request for customer service contact with respect to recipient satisfaction with physical package at receipt 116. In one such embodiment, recipient reaction information 124 includes a request for customer service contact. In one embodiment, server 104 receives recipient reaction information 124 including a request for customer service contact and forwards a request for customer service contact 130 to a customer service unit 132. Such a customer service unit 132 may be a computer system or a person or group of persons accessible via machine. Customer service unit 132 may then initiate a customer service contact 142 with mobile computing device 118 over media such as a phone call, short message service (SMS) message, chat, or email.

In an alternative embodiment, transaction information 126 may include information, such as a customer service URL or email address, to enable mobile computing device 118 to send a request for customer service contact directly to customer service unit 132 without the intervention of server 104. Some embodiments support the use of transaction information 126 as a means for a user of mobile computing device 118 to indicate that the user is preparing to return physical package at receipt 116 to a shipper and provide systems for facilitating that return, such as auto-produced return shipping labels. Such an indication that a user intends to return physical package at receipt 116 to a shipper may automatically trigger the presentation to a user of mobile computing device 118 of an interface for sending a request for customer service contact 130. An interface for facilitating a request for customer service contact related to the transaction is discussed below with respect to FIG. 10. In some embodiments, mobile computing device 118 allows a user to include any or all items of recipient reaction information 124 included in feedback about recipient satisfaction with physical package at receipt 116, described above, as part of request for customer service contact 130.

Additionally, server 104 may include a statistical analysis module or other facilities for using recipient reaction information 124 to compile transaction performance statistics 134 based on customer response information 136. For example, shippers of physical packages can be compared for frequency of complaints with respect to damage 128 using comparative damage statistics. Alternatively, on-time performance estimates can be calculated and estimated shipping times can be adjusted on the basis of time stamps indicating receipt of recipient reaction information 124. One skilled in the art will realize, in light of having read the present disclosure, that additional performance statistics, beyond those discussed herein, are supported by the embodiments disclosed herein and fall within the scope and intent of the embodiments disclosed herein.

Further, user interaction functions that can be performed by mobile computing device 118 include sending a social media update 138 to a social network 140. In one embodiment, transaction information 126 includes templates and addressing information for sending a social media update 138 to a social network 140. Subsequent iterations of recipient reaction information 124 then include updates, which are received by server 104. As used herein, the term recipient reaction information includes all communication related to the transaction associated with physical package at receipt 116 from mobile computing device 118 to the server, and the term "an item of" recipient reaction information may include multiple iterations or transmissions of one or more distinct items of recipient reaction information.

In alternative embodiments, templates for and addressing information for sending a social media update 138 to a social network 140 are stored in an application of mobile computing device 118, such that recipient reaction information 124 can include social media updates 138 without receipt of any transaction information 126 from server 104. In either case, social media update 138 is then sent by server 104 to a social network 140. In an alternative embodiment, transaction information 126 may include information, such as a social network server URL or email address, to enable mobile computing device 118 to send a social media update directly to social network 140 without the intervention of server 104. Social media updates 138 may be used to inform users of a social network 140, which may include the customer who originally created transaction request 102, of the receipt of and any commentary on physical package at receipt 116. An interface for facilitating a social media updates related to the transaction is discussed below with respect to FIG. 8.

FIG. 1B illustrates an example embodiment of a set of data structures that may be configured to implement transaction-related communication using machine-readable encoded information. In one embodiment, server 104 houses a transaction database 160 including transaction records 162a-162n and a user database 164 including user profiles 166a-166n.

Transaction record 162a includes data relating to a specific transaction or series of transactions that are related. Content of transaction record 162a includes transaction requests 168, which comprise details of the actual customer interactions that led to the creation of a transaction. An example of a transaction request is discussed above with respect to transaction request 102 of FIG. 1A. Transaction record 162 also includes fulfillment information 170, such as a listing of the inventory of individual physical packages shipped in fulfillment of a transaction request and tracking information related to the times and locations of the physical packages. In one embodiment, a mobile device can access tracking information related to a package received by a recipient and can access information related to other shipments associated with the same transaction and not yet received.

Contents of transaction record 162a also include encoded information 172, which comprises URLs that contain identifiers for associating physical packages described in fulfillment information 170 to the transaction described by transaction record 162a. When recipient reaction information is received from a user of a mobile device, feedback results 174 are added to transaction record 162a. Feedback results 174 may vary between a simple indication of a time stamp for receipt of recipient reaction information to detailed responses to a user questionnaire provided to the user by a mobile computing device. Additional embodiments of feedback information 174 may further include pictures of a physical package received through a mobile computing device and complete records of customer service interactions created as a result of a request for customer service contact. Some embodiments also support user narrative feedback in the form of text communications or audio transmissions from a recipient.

Contents of transaction record 162a also include documentation 176, which, in some embodiments s includes pointers to images, videos, or text that may be provided as part of transaction information to a recipient of a product contained in a physical package. Alternatively, the images, videos, or text themselves may be stored as part of transaction record 162a. Similarly, contents of transaction record 162a also include recorded greetings 178, which, in some embodiments include pointers to images, videos, or text that may be created by a customer and provided as part of transaction information to a recipient of a product contained in a physical package. Likewise, in some embodiments, the images, videos, or text themselves may be stored as part of transaction record 162a.

User database 164 contains a series of user profiles 166a-166n, each of which can be associated with a customer who creates a transaction or a recipient of a physical package associated with a transaction. Contents of user profile 166a include encoded information sent 180. Encoded information sent includes a listing of URLs of encoded information received from the user associated with user profile 166a as part of recipient reaction information. A set of social media preferences 182 within user profile 166a indicates whether a user desires to post social media updates to social networks, and to which social networks and under what conditions. Mobile computing device information 184 indicates the capabilities and communication defaults of a mobile computing device used by a particular recipient associated with user profile 166a.

A feedback history 186 contains information received from a user and may vary between a simple indication of a time stamp for receipt of recipient reaction information to detailed responses to a user questionnaire provided to the user by a mobile computing device. Feedback history 186 may further include pictures of a physical package received through a mobile computing device and complete records of customer service interactions created as a result of a request for customer service contact. A rewards history 188 includes information with respect to customer loyalty rewards programs that may be tracked and communicated to a user as a part of transaction information. Associated transactions 190 includes a listing of the transactions listed in transaction records 162a-162n that are associated with a particular user, either as recipient or purchaser.

Figure 2A:
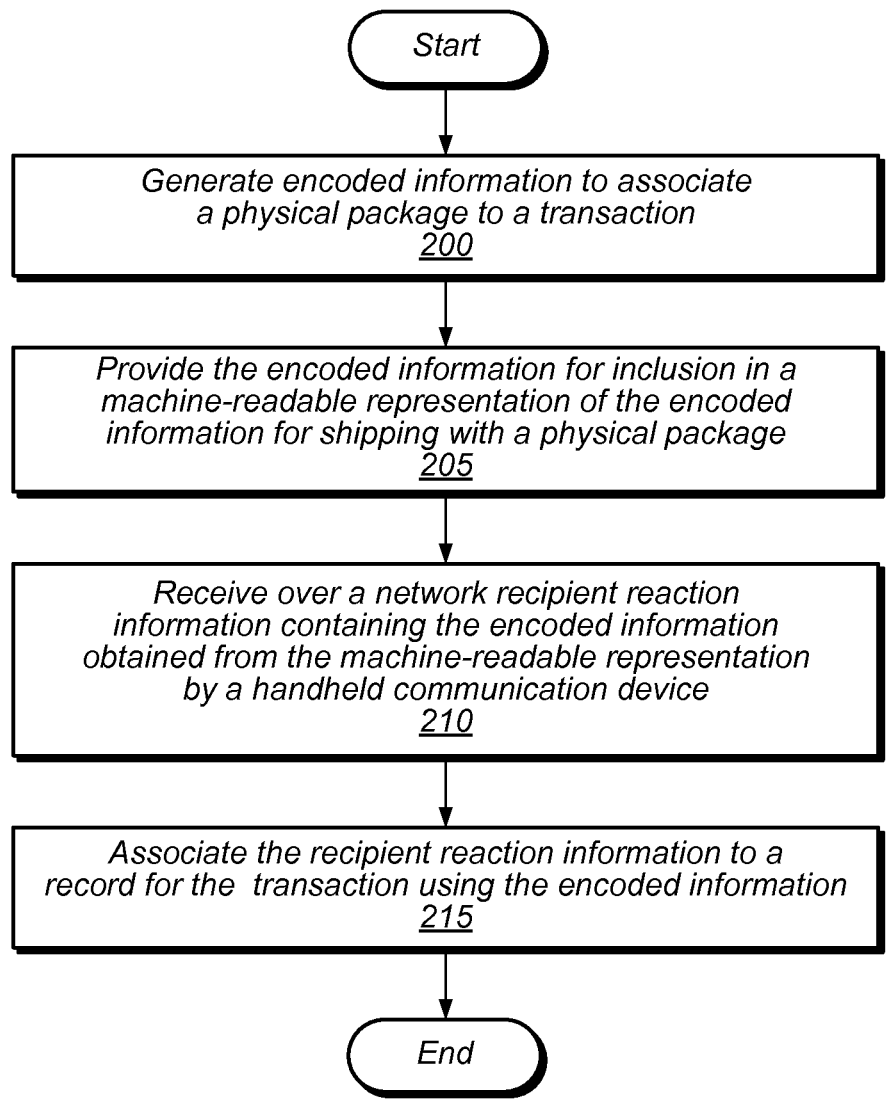
FIG. 2A is a high-level logical flowchart of server operations that may be performed in one example embodiment of a method for implementing transaction-related communication using machine-readable encoded information.

Server Operations for Providing Transaction-Related Communication Using Machine-Readable Encoded Information FIGS. 2A-2D illustrate example embodiments of server functions usable in a method for implementing transaction-related communication using machine-readable encoded information. Specifically, FIG. 2A is a high-level logical flowchart of server operations that may be performed in one example embodiment of a method for implementing transaction-related communication using machine-readable encoded information. Encoded information to associate a physical package to a transaction is generated (block 200). In one embodiment, the encoded information is a unique identifier, such as a serial number, that is capable of being used to uniquely associate a particular physical package to a particular transaction and is generated by an encoded information generating function. In some embodiments, the unique identifier is a URL containing such a serial number and encoded to facilitate a communication related to the physical package with a server. In some transactions, multiple physical packages will be associated with a single transaction. Therefore, the generation of encoded information to associate a physical package to a transaction is, in some embodiments, performed after an analysis to determine packaging requirements for a transaction. In other embodiments, generation of encoded information to associate a physical package to a transaction is performed after items are loaded into a physical package but before shipping.

The encoded information is provided for inclusion in a machine-readable representation of the encoded information for shipping with a physical package (block 205). Once encoded information is generated for a physical package, the encoded information may then be provided for inclusion in a machine-readable representation of the encoded information. In one embodiment, the providing is performed by a transmission function. As described above, the machine-readable representation of the encoded information may include only the encoded information in some embodiments. In other embodiments, however, the machine-readable representation may also carry additional data, such as a listing of the content of a package or a message from a party involved in the transaction (e.g., a customer creating the transaction or a manufacturer of a product included in the transaction) to a recipient of the physical package. Likewise, in some embodiments, a single machine-readable representation is included with a physical package. In other embodiments, however, multiple machine-readable representations will be included with a single package to facilitate instantaneous feedback of recipient reaction information by, for example, selecting a particular machine-readable representation off of the physical package to trigger the transmission of a particular message to a server. An example of a label including multiple machine-readable representations is discussed below with respect to FIG. 4B.

Recipient reaction information containing the encoded information obtained from the machine-readable representation by a handheld communication device is received over a network (block 210). In one embodiment, upon delivery of a physical package, a user of a mobile computing device invokes a scanning function of the mobile computing device to trigger a function for sending the encoded information to a server as recipient reaction information. In some embodiments, the encoded information is received by a receiving function as a URL. The URL can inform the server that the physical package has been received and can also provide additional information indicating user feedback. The recipient reaction information is associated to a record for the transaction using the encoded information (block 215). In one embodiment, an associating function performs the associating. An example of one embodiment of such a transaction record is discussed above with respect to FIG. 1A.

While the operations discussed with respect to FIG. 2A are discussed in the particular order depicted in FIG. 2A, one of skill in the art will readily realize, in light of having read the present disclosure, that the present disclosure embraces embodiments in which the same or similar operations are performed in a different order or with some operations omitted or other operations added. Likewise, while the operations discussed in FIGS. 2B-3C are discussed in terms of flows of particular operations performed in sequences chosen for clarity of discussion and depiction, one of skill in the art will readily realize, in light of having read the present disclosure, that the present disclosure embraces embodiments in which the same or similar operations are performed in a different order or with some operations omitted or other operations added.

Figure 2B:
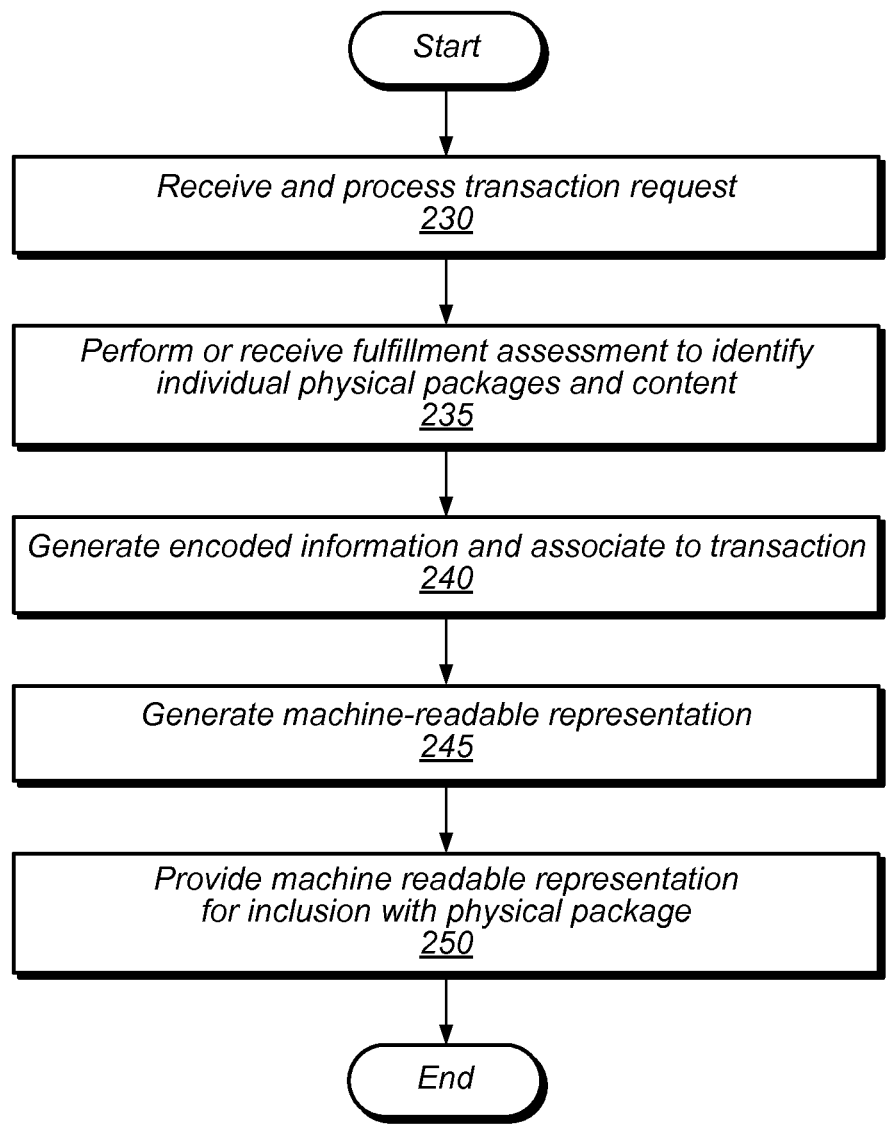
FIG. 2B is a high-level logical flowchart of server operations, related to assignment of encoded information to a physical package, that may be performed in one example embodiment of a method for implementing transaction-related communication using machine-readable encoded information.

FIG. 2B is a high-level logical flowchart of server operations, related to assignment of encoded information to a physical package, that may be performed in one example embodiment of a method for implementing transaction-related communication using machine-readable encoded information. A transaction request is received and processed (block 230). In one embodiment, a transaction request is received by a server from a customer terminal using a hypertext interface. An example of a typical transaction request is a user request for a transaction over a website-based e-commerce portal in which an order for physical goods is placed. In such a transaction request, a user of a customer terminal indicates one or more items for shipping to a recipient at an indicated address. The recipient and the customer placing the transaction request may or may not be the same entity. In alternative embodiments, a transaction request need not involve a hypertext interface. An alternative embodiment of a transaction request may be received as an SMS message from a mobile computing device or may be received through a voice interaction with a user of an IVR purchasing system.

A fulfillment assessment is performed or received to identify individual physical packages and content (block 235). Because the nature of items, the quantity of items in an order, and the shipping requirements of individual items will vary within and between transaction requests, some embodiments support the performance of a fulfillment assessment to identify the specific allocation of items to packages associated with an order. From this fulfillment assessment, packages are associated to items within an order. Encoded information is generated for necessary packages and associated to the transaction (block 240). In one embodiment, the encoded information is a serial number identifying a particular physical package containing items specified in the fulfillment analysis. In alternative embodiments, the encoded information is a URL. A machine-readable representation is generated (block 245). In some embodiments, the machine-readable representation is a QR code encoding a URL for communication with a server, such that, when the URL is received over a hypertext interface of the server, code executing within the server queries a database and locates a transaction record associated with the encoded information contained in the URL. The machine-readable representation is provided for inclusion with the physical package (block 250). In some embodiments, the machine-readable representation is a label affixed to the exterior of the physical package. In other embodiments, an RFID chip can be inserted into the physical package. In other alternative embodiments, the machine-readable representation of the encoded information can be embossed or burned into the exterior of the physical package.

Figure 2C:
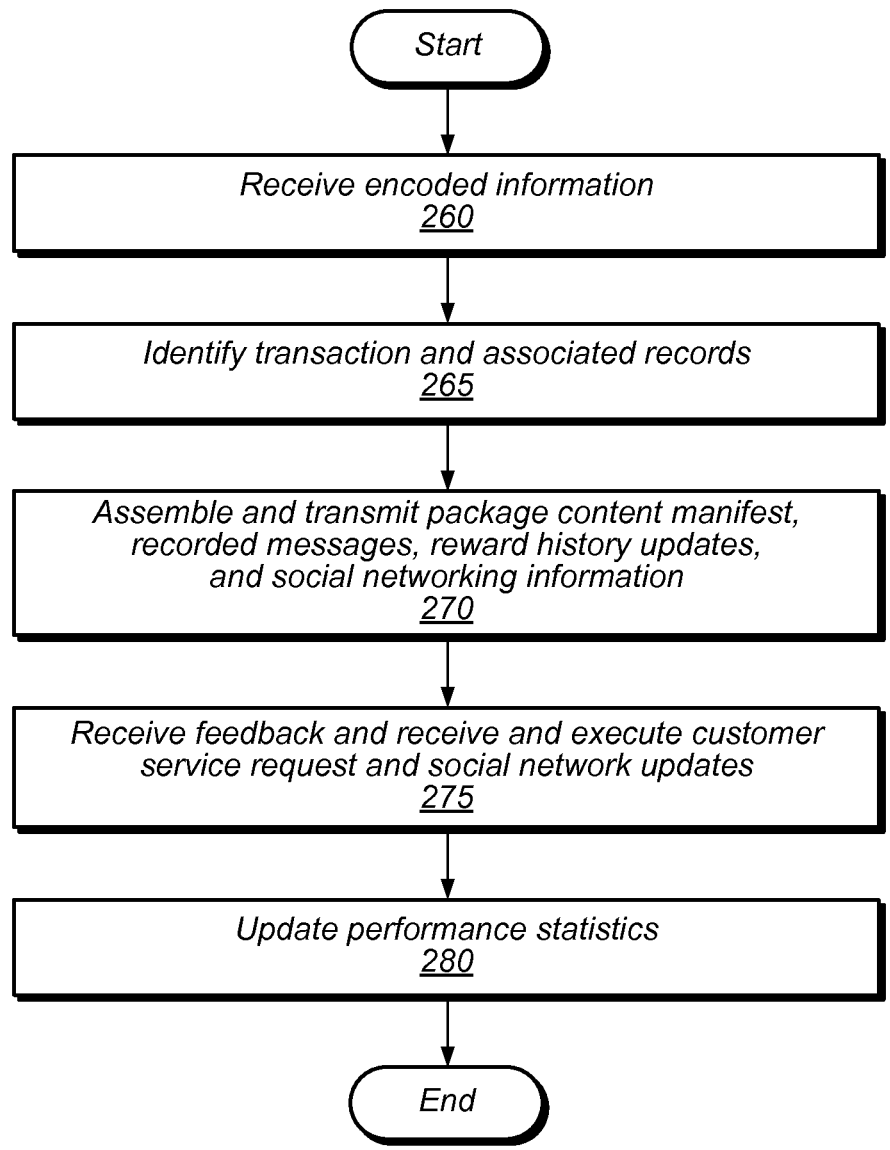
FIG. 2C is a high-level logical flowchart of server operations, related to receipt and processing of encoded information, that may be performed in one example embodiment of a method for implementing transaction-related communication using machine-readable encoded information.

FIG. 2C is a high-level logical flowchart of server operations, related to receipt and processing of encoded information, that may be performed in one example embodiment of a method for implementing transaction-related communication using machine-readable encoded information. Encoded information is received (block 260). In one embodiment, a server receives the encoded information as a URL transmitted to a hypertext interface of the server over a network. In alternative embodiments, the encoded information may be received using alternative data communication means, such as an SMS interface associated with the server. A transaction and associated database records are identified (block 265). In one embodiment, the transaction and associated database records are located using a database query to a transaction database containing transaction records and user profiles. An example of such a transaction database was described above with respect to FIG. 1B.

A package inventory data structure containing a content manifest, as well as recorded messages, reward history updates, and social networking information are assembled and transmitted (block 270). In one embodiment, the package inventory data structure containing a content manifest, as well as recorded messages, reward history updates, and social networking information are transmitted by a transaction information delivery function over a packetized data network such as the Internet using a conventional HTTP interface. In alternative embodiments, alternative network systems, such as SMS messaging or a digital telephony interface, can be used to transmit package inventory data structure containing a content manifest, as well as recorded messages, reward history updates, and social networking information. In some embodiments, recorded messages include suggestions, in any applicable medium, that a recipient purchase a second product on the basis of having received a first product. In other embodiments, recorded messages include notification of a discount on the basis of having received a given product.

Feedback is received, and customer service requests and social network updates are received and executed (block 275). In some embodiments, feedback can be used as a social media update and forwarded to a social network as a social media update. In some embodiments, social network updates are executed by forwarding the social network update to a specified social network. For example, a "tweet" is sent to Twitter™ or a Facebook™ update is sent to Facebook™. Performance statistics are updated (block 280). Performance statistics will vary between embodiments but may include metrics related to customer satisfaction with particular shippers, accounting of damage complaints for comparison between shippers, and comparison of actual delivery times to predicted delivery schedules for the present transaction or for other similar transactions present in a transaction database. In some embodiments, a delivery schedule adjustment function is provided.

Figure 2D:
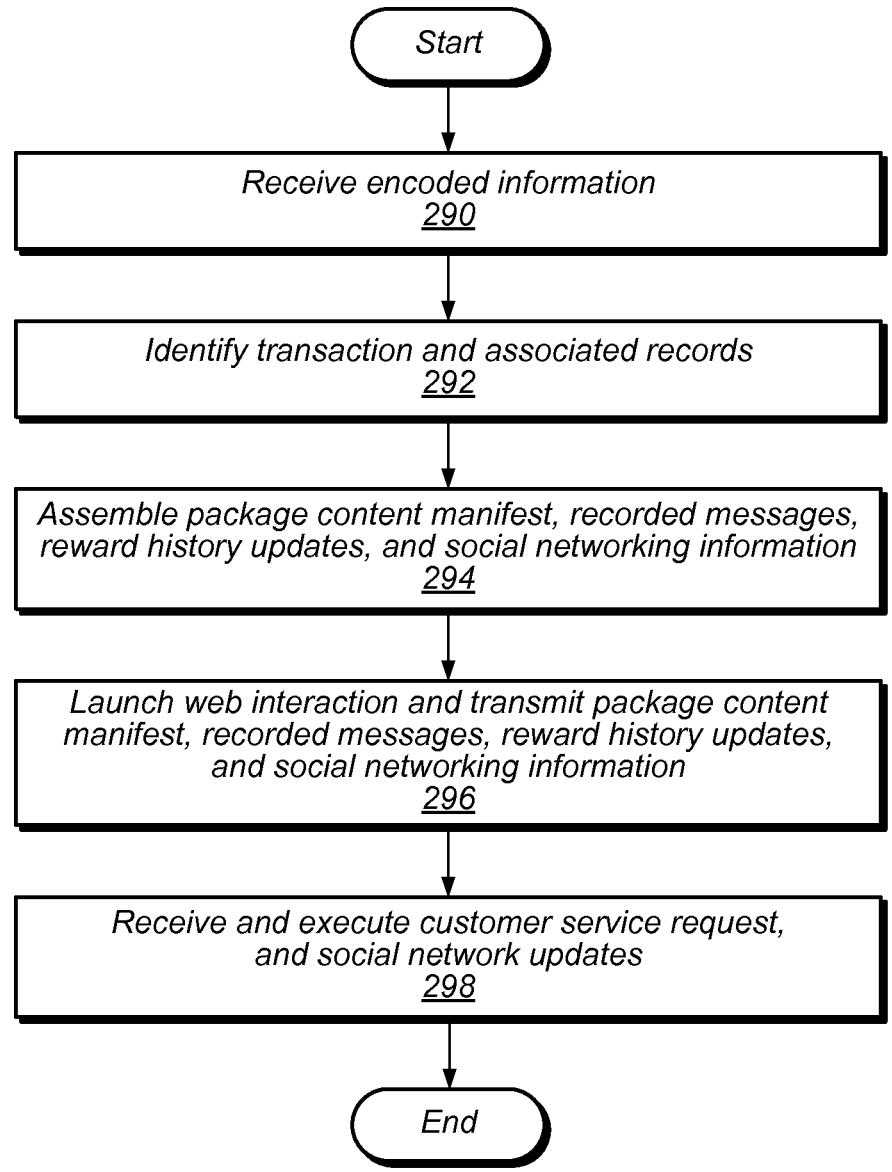
FIG. 2D is a high-level logical flowchart of server operations performed in one example embodiment of a method for implementing transaction-related communication through a hypertext interface using machine-readable encoded information.

FIG. 2D is a high-level logical flowchart of server operations performed in one example embodiment of a method for implementing transaction-related communication through a hypertext interface using machine-readable encoded information. Encoded information is received (block 290). In one embodiment, a server receives the encoded information as a URL transmitted to a hypertext interface of the server over a network. The relevant transaction and associated records are identified (block 292). In one embodiment, the transaction and associated database records are located using a database query to a transaction database containing transaction records and user profiles. An example of such a transaction database was described above with respect to FIG. 1B. A package content manifest, recorded messages, reward history updates, and social networking information are assembled (block 294). A web interaction is launched and package content manifest, recorded messages, reward history updates, and social networking information are transmitted (block 296).

In one embodiment, authentication of an identity of a user may be performed by an authentication module in conjunction with the transmitting. In one embodiment, a generic QR code reader is used to scan a QR code on the exterior of a package. Upon reading a URL in the QR code, a web browser is launched and the URL is transmitted to the server that receives the encoded information in block 290. In such an embodiment, a web interaction with the client that sent the URL is established and the package inventory data structure containing a content manifest, as well as recorded messages, reward history updates, and social networking information are transmitted over a packetized data network such as the Internet using a convention HTTP interface. A customer service request, and social network updates are received and executed (block 298). In some embodiments, a customer service interaction request function and a social media update function, respectively execute customer service requests and social network updates. In some embodiments, social network updates are executed by forwarding the social network update to a specified social network. For example, a "tweet" is sent to servers operating on behalf of Twitter™ or a Facebook™ update is sent to servers operating on behalf of Facebook™

Figure 3A:
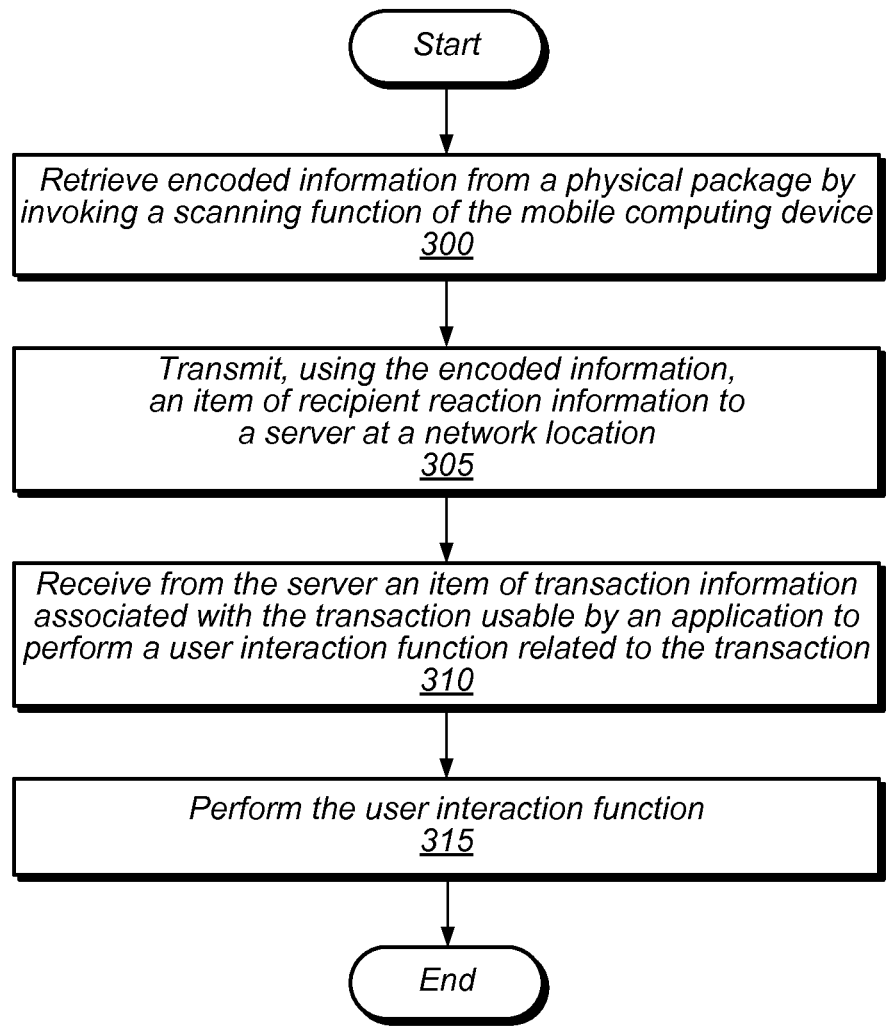
FIG. 3A is a high-level logical flowchart of mobile computing device operations that may be performed in one example embodiment of a method for implementing transaction-related communication using machine-readable encoded information.
Figure 3B:
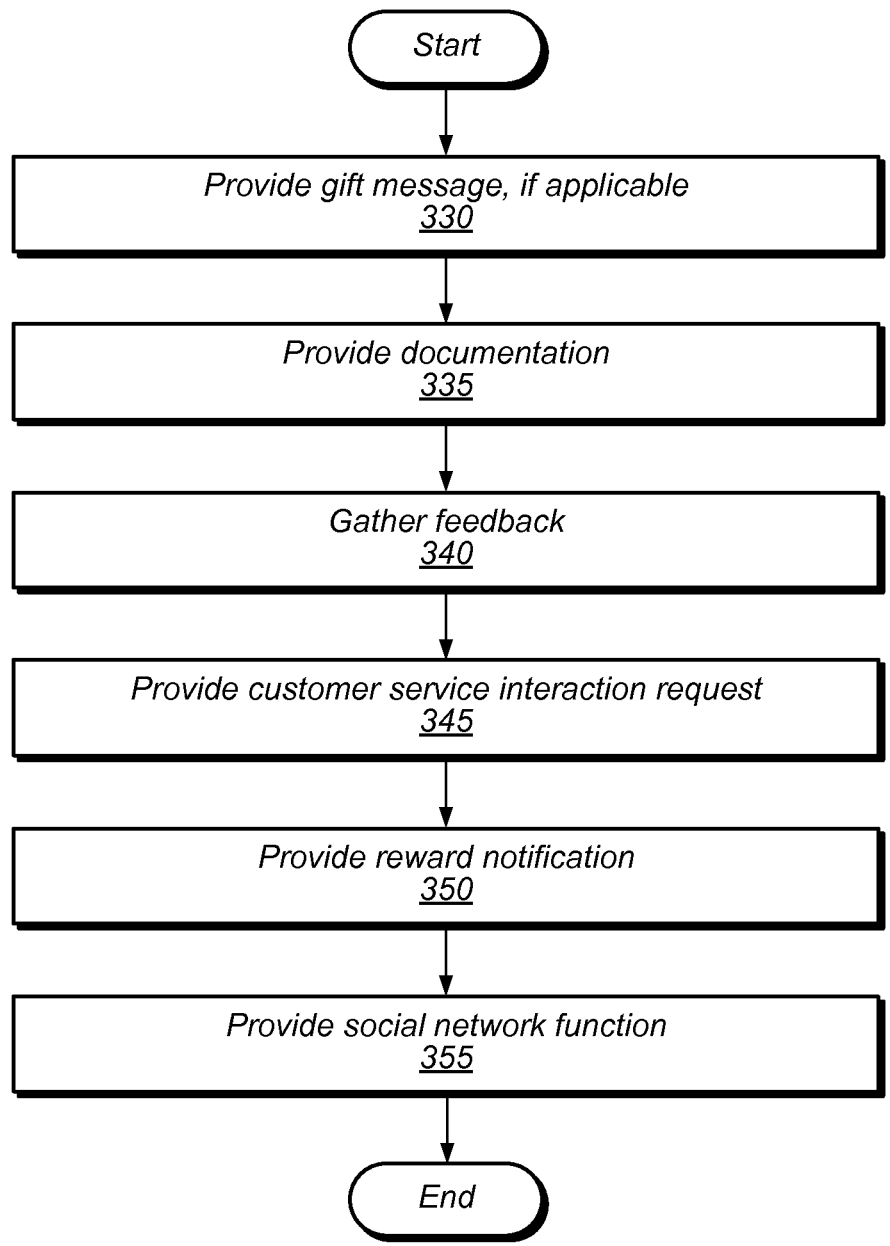
FIG. 3B is a high-level logical flowchart of mobile computing device functions that may be implemented through one example embodiment of a method for implementing transaction-related communication using machine-readable encoded information.
Figure 3C:
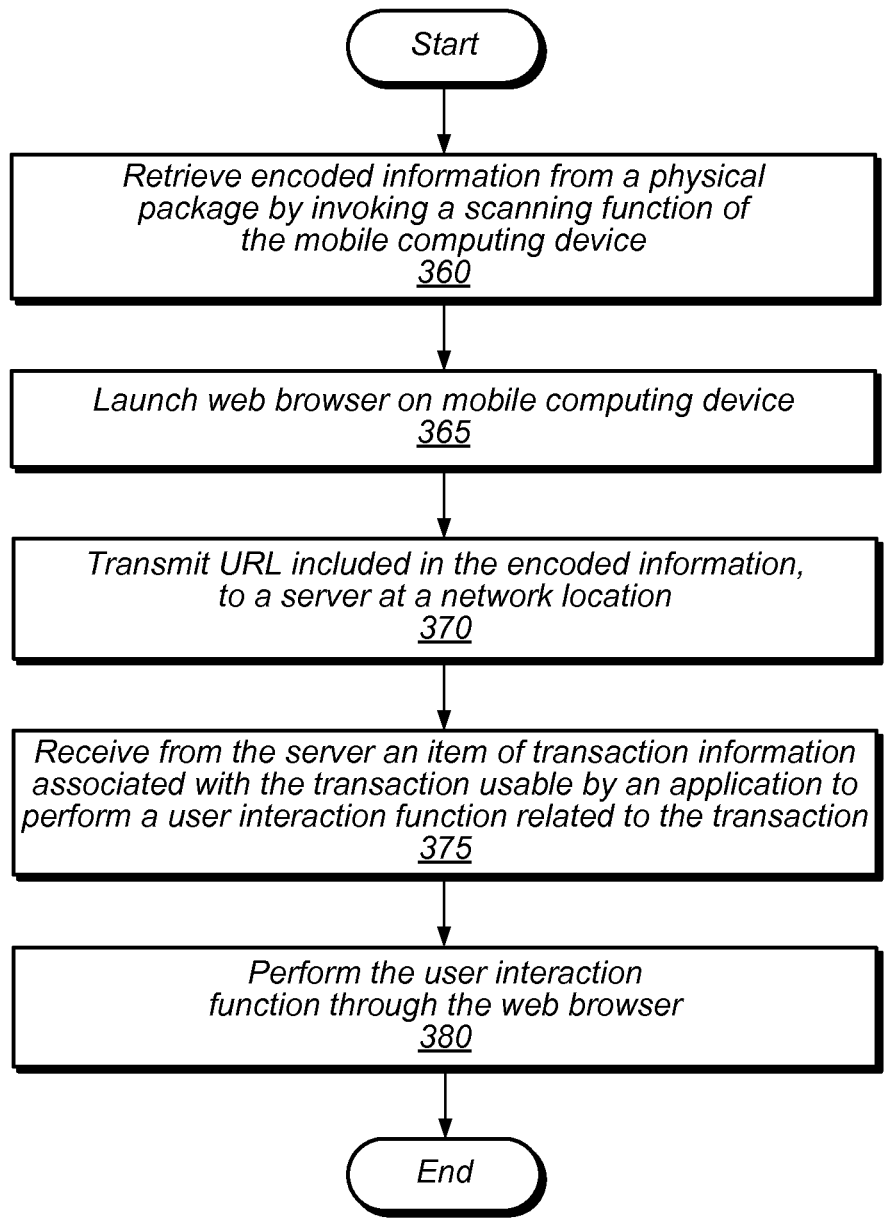
FIG. 3C is a high-level logical flowchart of mobile computing device operations performed in one example embodiment of a method for implementing transaction-related communication through a hypertext interface using machine-readable encoded information.

Mobile Computing Device Operations for Providing Transaction-Related Communication Using Machine-Readable Encoded Information FIGS. 3A-3C illustrate example embodiments of mobile computing device functions usable in an example embodiment of a method for implementing transaction-related communication using machine-readable encoded information. Specifically, FIG. 3A is a high-level logical flowchart of mobile computing device operations that may be performed in one example embodiment of a method for implementing transaction-related communication using machine-readable encoded information. Encoded information is retrieved from a physical package by invoking a scanning function of the mobile computing device (block 300). Retrieval of encoded information will vary between embodiments. In some embodiments, a generic QR code reader will be used to capture a picture of a QR code using a camera included in a mobile device. The QR code is then decoded by the generic QR code reader. In other embodiments, a purpose-built application for providing transaction-related communication using machine-readable encoded information captures a picture of a QR code using the camera included in the mobile device and extracts the encoded information. In embodiments including a purpose-built application for providing transaction-related communication using machine-readable encoded information, the encoded information may be reduced to a mere serial number that can then be transmitted back to a server.

Using the encoded information, an item of recipient reaction information is transmitted to a server at a network location (block 305). In some embodiments, the encoded information is transmitted as a URL over a data interface. In other embodiments, the encoded information is transmitted over an SMS interface. An item of transaction information associated with the transaction usable by an application to perform a user interaction function related to the transaction is received from the server (block 310). Transaction information may be received over a variety of messaging services, including hypertext and SMS, which will vary between embodiments. The user interaction function is performed (block 315). Interface examples for performing user interaction functions are described below with respect to FIGS. 5-10.

FIG. 3B is a high-level logical flowchart of mobile computing device functions that may be implemented through one example embodiment of a method for implementing transaction-related communication using machine-readable encoded information. Gift messages, if applicable are provided (block 330). In one embodiment, a gift message is a document associated with a transaction by the purchaser at the time of the transaction request. In some embodiments, providing a gift message will include delivery of a video or audio segment recorded by a customer for delivery to the user by a mobile computing device at or subsequent to the time of package receipt. In other embodiments, prepared e-cards may be designated by a customer for delivery to the user by a mobile computing device at or subsequent to the time of package receipt. Similarly, in some embodiments, text messages or uploaded images may be provided for delivery to the user by a mobile computing device at or subsequent to the time of package receipt. Documentation is provided (block 335). In some embodiments, the documentation takes the form of recorded messages, such as video or audio instructions for using, unpacking, or deploying a product. Documentation can also take the form of still images or written messages providing information that a supplier of a product desires to deliver to a user.

Feedback is gathered (block 340). As discussed above, feedback gathering takes forms that will vary between embodiments. In some embodiments, a single package includes multiple QR codes, and labeling associated with the QR codes indicates to the user that the scanning of a particular QR code from among the multiple QR codes provides information with respect to user satisfaction regarding the received package. An example of such labeling is provided below with respect to FIG. 4B. Additionally, some embodiments implement feedback gathering as a quantitative survey with respect to user satisfaction. Such an embodiment is discussed below with respect to FIG. 9. Further, some embodiments support gathering feedback that includes images or videos captured with a camera of the mobile computing device or text entered by a user.

Figure 10:
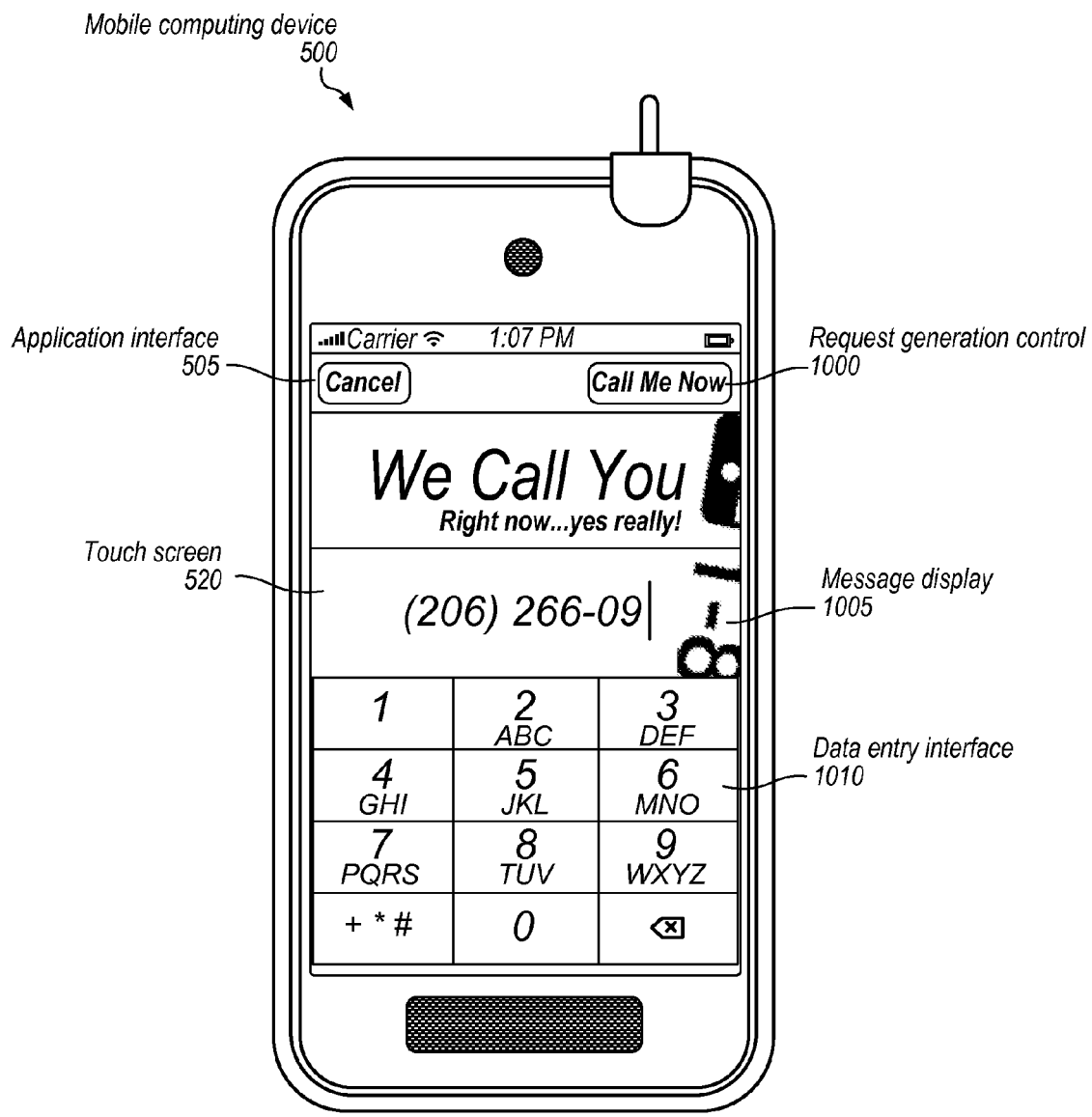
FIG. 10 is an example embodiment of a user interface of a mobile computing device for implementing transaction-related customer-service communication using machine-readable encoded information.

A customer service interaction request is provided (block 345). Formats of customer interaction service requests will vary between embodiments. An example embodiment of an interface for providing a customer service interaction request is discussed below with respect to FIG. 10. While the embodiment described with respect to FIG. 10 is shown as providing an interface for reporting a phone number to which a customer service contact should be directed, one of skill in the art will realize that customer service interaction request interfaces will vary between embodiments without departing from the scope and intent of the present disclosure. Specifically, interfaces in various embodiments will support customer service interaction requests in formats that include chat, SMS, and electronic mail. Additionally, in some embodiments, any of the forms of feedback discussed above, such as audio, video, text, and still images, may be supported for providing information in the context of a customer service interaction request. In one embodiment, a request for customer service interaction request can be automatically triggered in response to feedback indicating dissatisfaction.

Reward notification is provided (block 350). A social network function is provided (block 355). In some embodiments, a social network function provides an interface for generating and transmitting social network updates for forwarding to one or more specified social networks. An example embodiment of an interface provided by a social network function is discussed below with respect to FIG. 8. In some embodiments, a social network interface will provide access to templates for creating social network updates that conform to the various rules associated with social networks selected by the user. As an example of such a rules-based template, a template in one embodiment for sending a tweet to Twitter™ limits a message included in the social network update to a total of 140 characters.

FIG. 3C is a high-level logical flowchart of mobile computing device operations performed in one example embodiment of a method for implementing transaction-related communication through a hypertext interface using machine-readable encoded information. Encoded information is retrieved from a physical package by invoking a scanning function of the mobile computing device (block 360). A web browser on the mobile computing device is launched (block 365). A URL included in the encoded information is transmitted to a server at a network location (block 370). In one embodiment, authentication of an identity of a user may be performed in conjunction with the transmitting. An item of transaction information associated with the transaction usable by an application to perform a user interaction function related to the transaction is received from a server (block 375). The user interaction is performed through the web browser (block 380).

Example Machine-Readable Encoded Information Embodiments

Figure 4A:
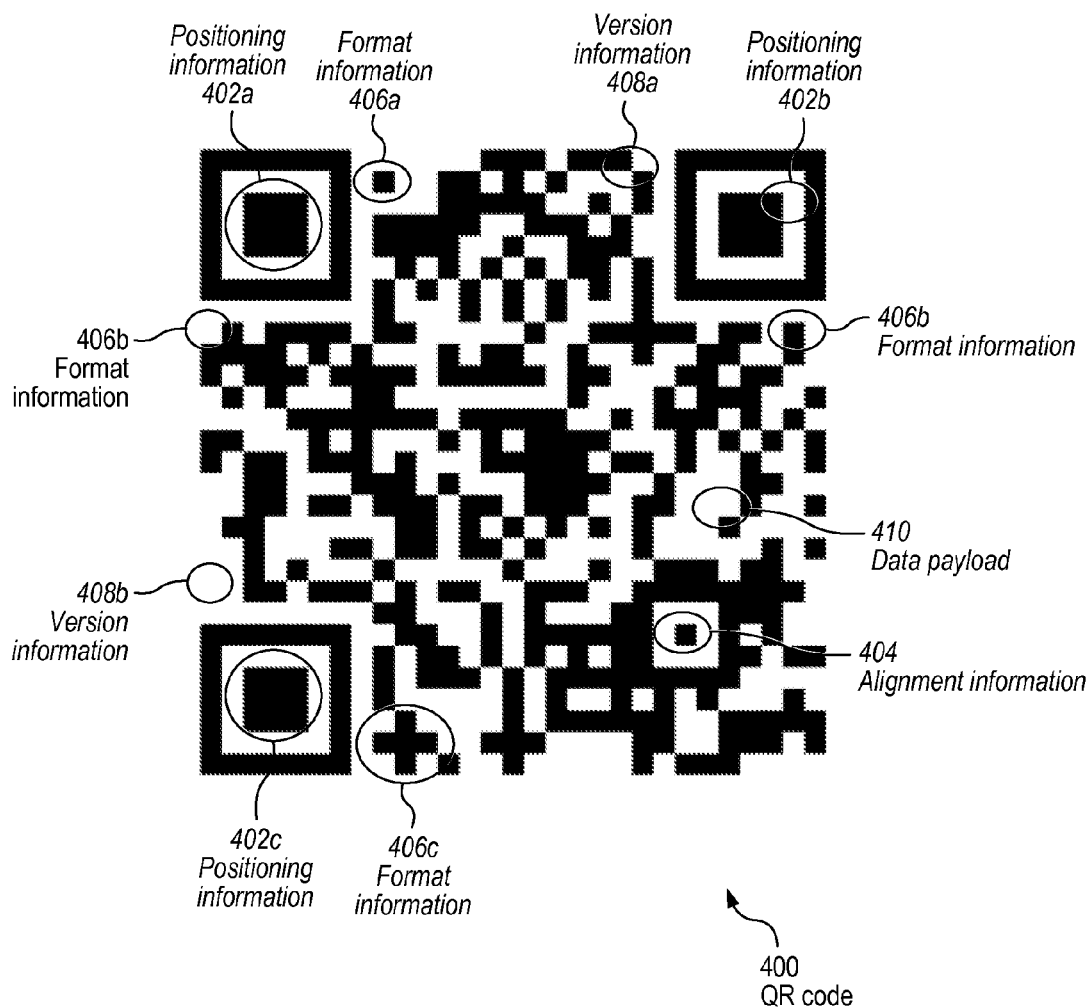
FIG. 4A is an example illustration of one embodiment of a two-dimensional and optically scanable representation of encoded information for implementing transaction-related communication using machine-readable encoded information.
Figure 4B:
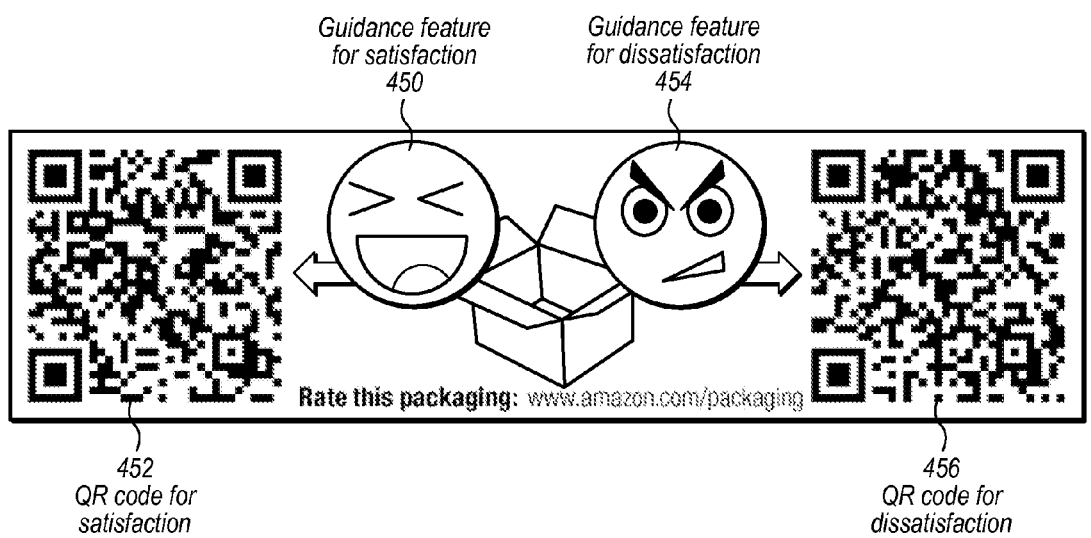
FIG. 4B is an example illustration of one embodiment of a two-dimensional and optically scanable representation of encoded information containing customer feedback for implementing transaction-related communication using machine-readable encoded information.

FIGS. 4A-4B illustrate example embodiments of machine-readable representations of encoded information usable in an example embodiment of a method for implementing transaction-related communication using machine-readable encoded information. FIG. 4A is an example illustration of one embodiment of a two-dimensional and optically scanable representation of encoded information for implementing transaction-related communication through a hypertext interface using machine-readable encoded information. A QR code 400 is a matrix barcode (or two-dimensional code), readable by QR scanners, mobile phones with a camera, and smartphones. The code consists of black modules arranged in a square pattern on white background. The information encoded can be text, URL or other data. QR code 400 contains positioning information 402a-402c. Positioning information 402a-402c and alignment information 404 are used together to allow a QR reader to adjust its processing of the QR code 400 based on alignment of the QR code relative to the reader. Format information 406a-406d and version information 408a-408b enable a QR reader to correctly interpret a data payload 410. In some embodiments, a single QR code is used with a package to provide a machine-readable representation of encoded information associated with the package. In other embodiments, such as that discussed below with respect to FIG. 4B, multiple QR codes are provided for providing multiple machine-readable representations of encoded information associated with the package The Android™ operating system by Google™ supports the use of QR code 400 by natively including a barcode scanner (ZXing) on some models, and the browser supports URL redirection, which allows QR codes to send metadata to existing applications on the device. The Symbian™ operating system by Nokia™ is also provided with a barcode scanner, which is able to read QR codes. In the Apple™ iOS™, support for QR code 400 is not natively included, but some applications available on iTunes™ are available with reader and metadata browser URL redirection. Several published standards exist for describing use of QR code 400. QR code 400 can support 4,296 alphanumeric characters.

FIG. 4B is an example illustration of one embodiment of a two-dimensional and optically scannable representation of encoded information containing customer feedback for implementing transaction-related communication using machine-readable encoded information. A guidance feature for satisfaction 450 instructs a user to select a QR code for satisfaction 452 if the user is satisfied with the package. Likewise, a guidance feature for dissatisfaction 454 instructs a user to select a QR code for dissatisfaction 456 if the user is dissatisfied with the package. In selecting one of QR code for satisfaction 452 and QR code for dissatisfaction 456, the user is able to provide immediate feedback with respect to a physical package.

Further, QR code for satisfaction 452 encodes a different URL from that encoded by QR code for dissatisfaction 456, thereby enabling a mobile computing device to provide different user experiences depending on whether QR code for satisfaction 452 or QR code for dissatisfaction 456 is selected. In one embodiment, if QR code for satisfaction 452 is selected, a user interface for providing social network updates, such as that described below with respect to FIG. 8, may be displayed to the user. Alternatively, if QR code for dissatisfaction 456 is selected, a user interface for requesting customer service interaction, such as that discussed below with respect to FIG. 10, may be immediately displayed. While a bifurcation of mobile computing device responses on the basis of a pair of QR codes is discussed with respect to FIG. 4B, one of skill in the art will realize in light of having read the present disclosure that more than two QR codes can be included in a single package and that the response of a mobile computing device to the selection of one of a set of QR codes can be varied in response to factors in addition to the content of the QR code, such as customer history or device location, without departing from the scope and intent of the embodiments disclosed herein.

Example Interface Embodiments

Figure 5:
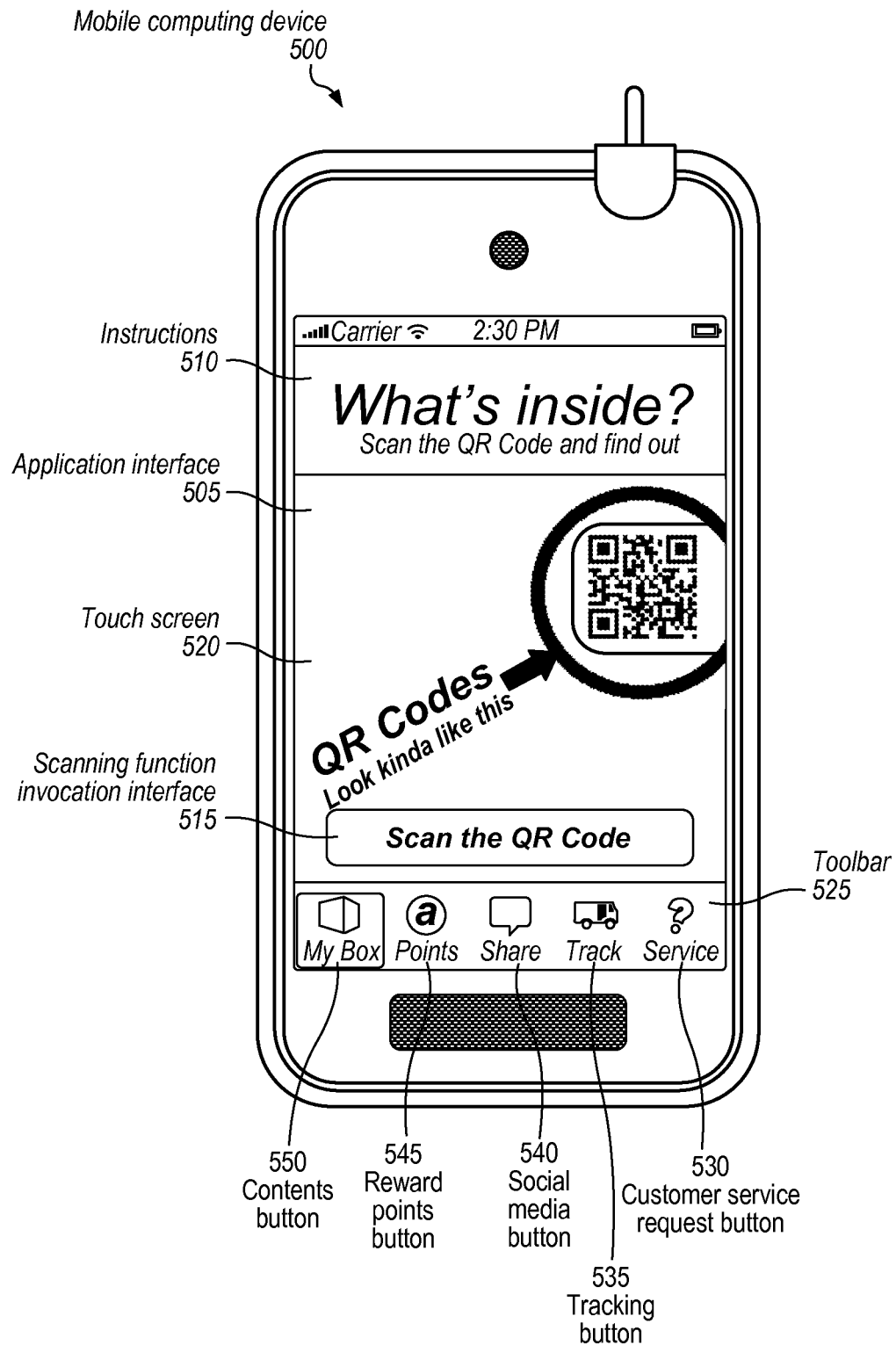
FIG. 5 is an example embodiment of a user interface of a mobile computing device for implementing transaction-related communication using machine-readable encoded information.

FIGS. 5-10 portray various example embodiments of user interfaces usable in a method for implementing transaction-related communication using machine-readable encoded information. Specifically, FIG. 5 is an example embodiment of a user interface of a mobile computing device for implementing transaction-related communication using machine-readable encoded information. A mobile computing device 500 displays an application interface 505. Application interface 505 includes instructions 510 directing a recipient to invoke a scanning function of mobile computing device 500 while pointing the camera (not shown) of mobile computing device 500 at a machine-readable representation on the subject package (also not shown). A scanning function invocation interface 515 takes the form of a button labeled "scan the QR code" on a touch-screen 520. Actuation of scanning function invocation interface 515 triggers invocation of a scanning function of the mobile computing device 500.

In the embodiment displayed in FIG. 5, application interface 505 is designed to guide a user through the process of retrieving, by an application executing on mobile computing device 500, encoded information in a QR code displayed on a physical package by invoking a scanning function of mobile computing device 500. The encoded information in the QR code associates the physical package with a transaction. Once this retrieval is performed, mobile computing device 500 is configured to transmit, using the encoded information, an item of recipient reaction information to a server at a network location and receive an item of transaction information associated with the transaction. As will be further discussed below with respect to FIGS. 6-10, the item of transaction information is usable by the application to perform a user interaction function related to the transaction.

A toolbar 525 contains a customer service request button 530, a tracking button 535, a social media button 540, a reward points button 545, and a contents button 550. Actuation of customer service request button 530 invokes an interface for sending a request for a customer service interaction. An example of such an interface is described below with respect to FIG. 10. Actuation of tracking button 535 invokes an interface for viewing tracking information related to the package. Actuation of social media button 540 invokes an interface for sending a social media update to a social network. An example of such an interface is described below with respect to FIG. 8. Actuation of rewards points button 545 invokes an interface for viewing rewards points information with respect to transactions associated with the recipient. Actuation of contents button 550 invokes an interface for viewing a data structure describing contents of the package. An example of such an interface is described below with respect to FIG. 6.

Figure 6:
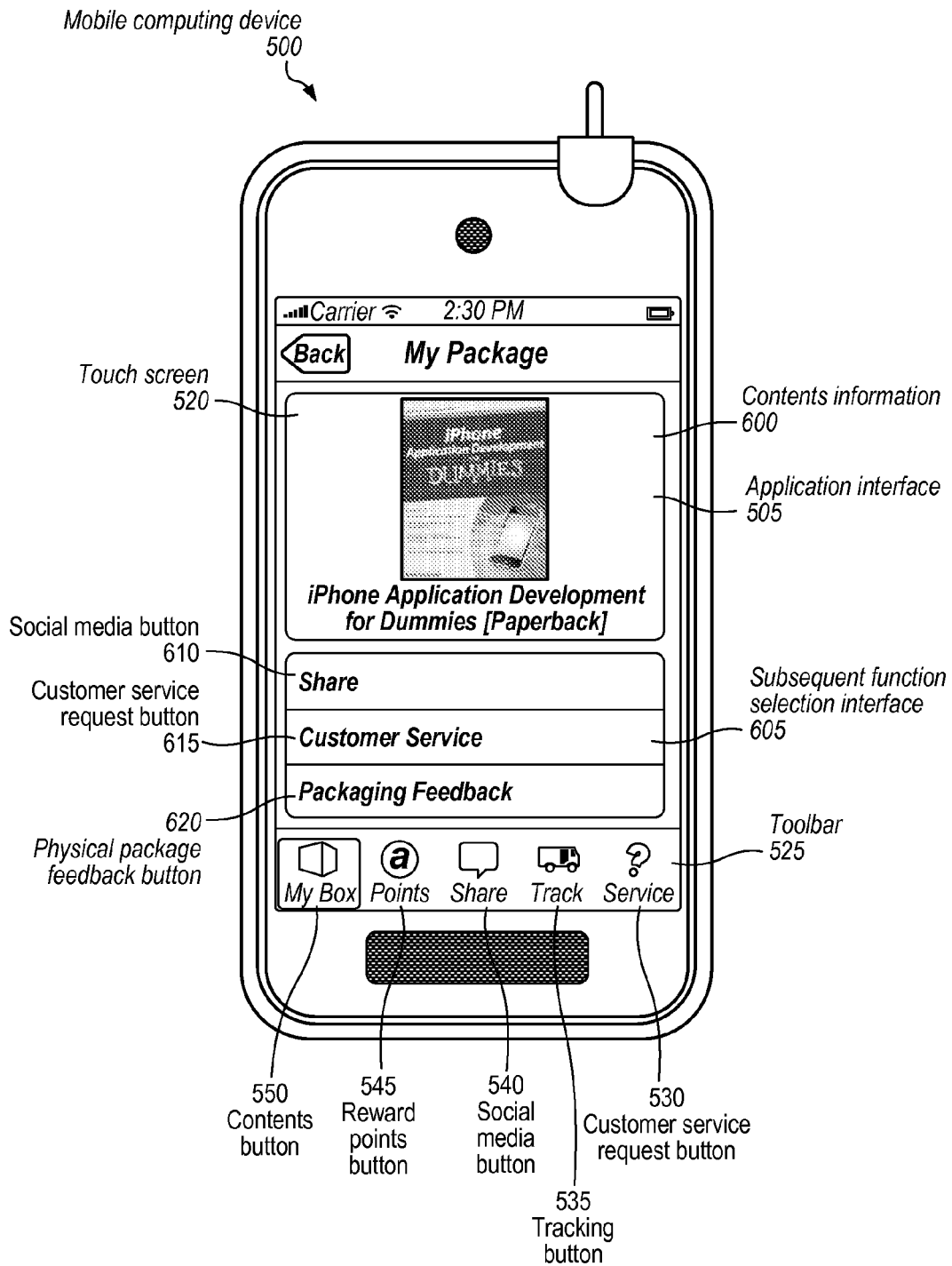
FIG. 6 is an example embodiment of a user interface of a mobile computing device for implementing transaction-related communication related to an inventory of package content using machine-readable encoded information.

FIG. 6 is an example embodiment of a user interface of a mobile computing device for implementing transaction-related communication related to an inventory of package content using machine-readable encoded information. Application interface 505 of mobile device 500 displays contents information 600 on touch screen 520. Contents information 600 is a data structure indicating contents of the physical package. In the example presented in FIG. 6, contents information 600 is presented as an image portraying a product included in the physical package (not shown). In alternative embodiments, contents information 600 is a list of products or one or more specification sheets for one or more products. In addition to contents information 600, application interface 505 includes a subsequent function selection interface 605. Subsequent function selection interface 605 includes a social media button 610, a customer service request button 615 and a physical package feedback button 620. Actuation of customer service request button 615 invokes an interface for sending a request for a customer service interaction. Actuation of social media button 610 invokes an interface for sending a social media update to a social network. Actuation of physical package feedback button 620 invokes an interface for sending feedback information to a server. Toolbar 525 contains customer service request button 530, tracking button 535, social media button 540, reward points button 545, and contents button 550.

Figure 7:
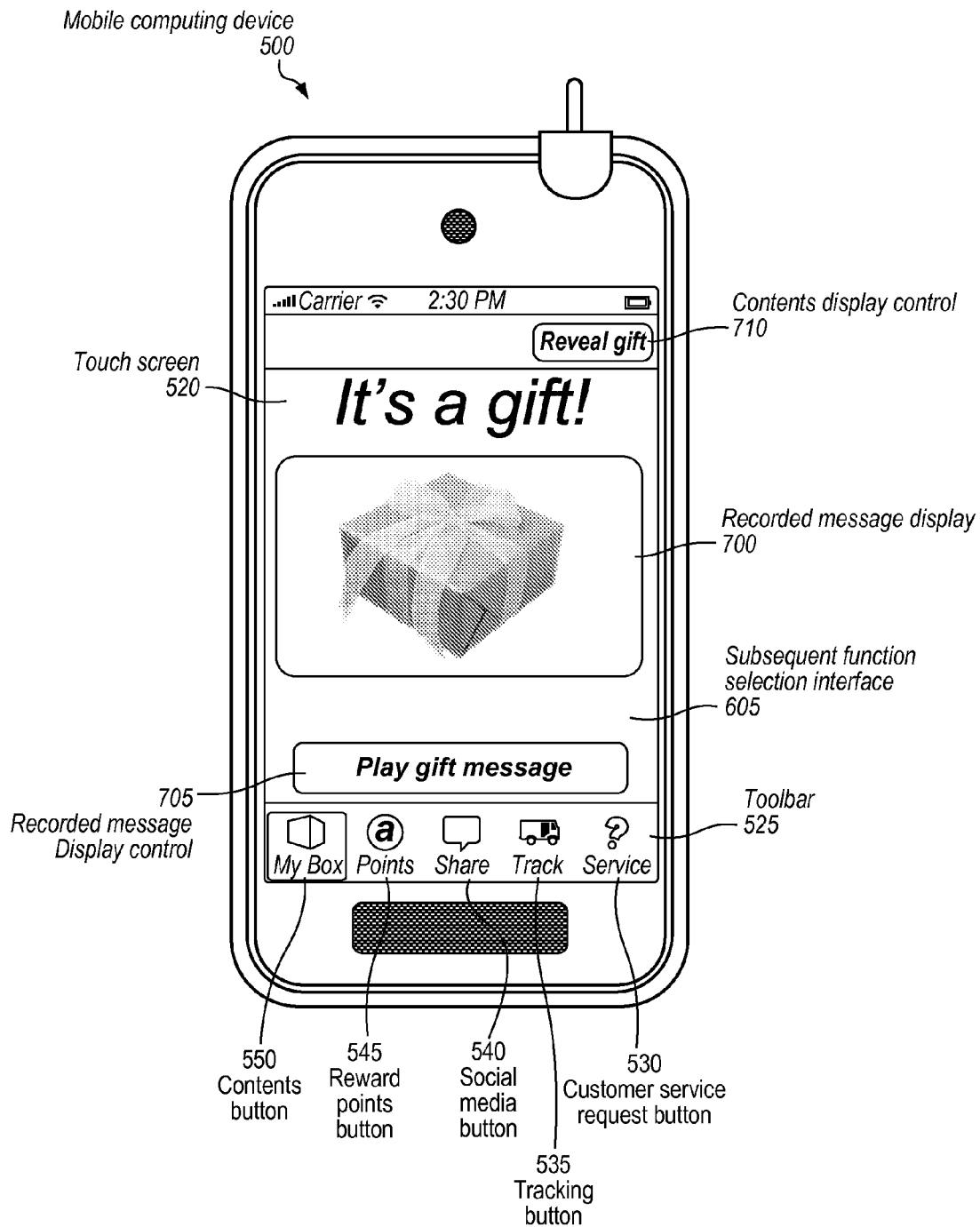
FIG. 7 is an example embodiment of a user interface of a mobile computing device for implementing transaction-related communication related to pre-recorded message content using machine-readable encoded information.

FIG. 7 is an example embodiment of a user interface of a mobile computing device for implementing transaction-related communication related to pre-recorded message content using machine-readable encoded information. Application interface 505 of mobile device 500 displays a recorded message display 700 on touch screen 520. In the example shown in FIG. 7, recorded message display 700 is presented as a window for displaying a gift message video. Recorded message display 700 is also used for providing text, images, or a static image while audio is played through a speaker. Further, recorded message display 700 is used for providing documentation or other messages from a seller or supplier in any of the media formats supported by recorded message display 700. A recorded message display control 705 allows a user to initiate or suspend the display of information on recorded message display 700. Additionally, a contents display control 710 allows a user to invoke an interface for displaying package contents, such as that described above with respect to FIG. 6. Toolbar 525 contains customer service request button 530, tracking button 535, social media button 540, reward points button 545, and contents button 550.

In one embodiment, a recorded message displayed over recorded message display 700 can be created by a customer as part of a transaction request. Such a recorded message can be a text message, audio file, video file, image file or markup document prepared by a customer. Alternatively, such a recorded message may be documentation associated with the contents of the package, taking the form of a text message, audio file, video file, image file or markup document prepared by a supplier of the contents of package. Alternatively, such a recorded message can indicate that a user has earned a reward through a reward program. In some embodiments, a data structure containing the recorded message can be included in a machine-readable representation of encoded information and can be read directly from machine-readable representation of encoded information.

Figure 8:
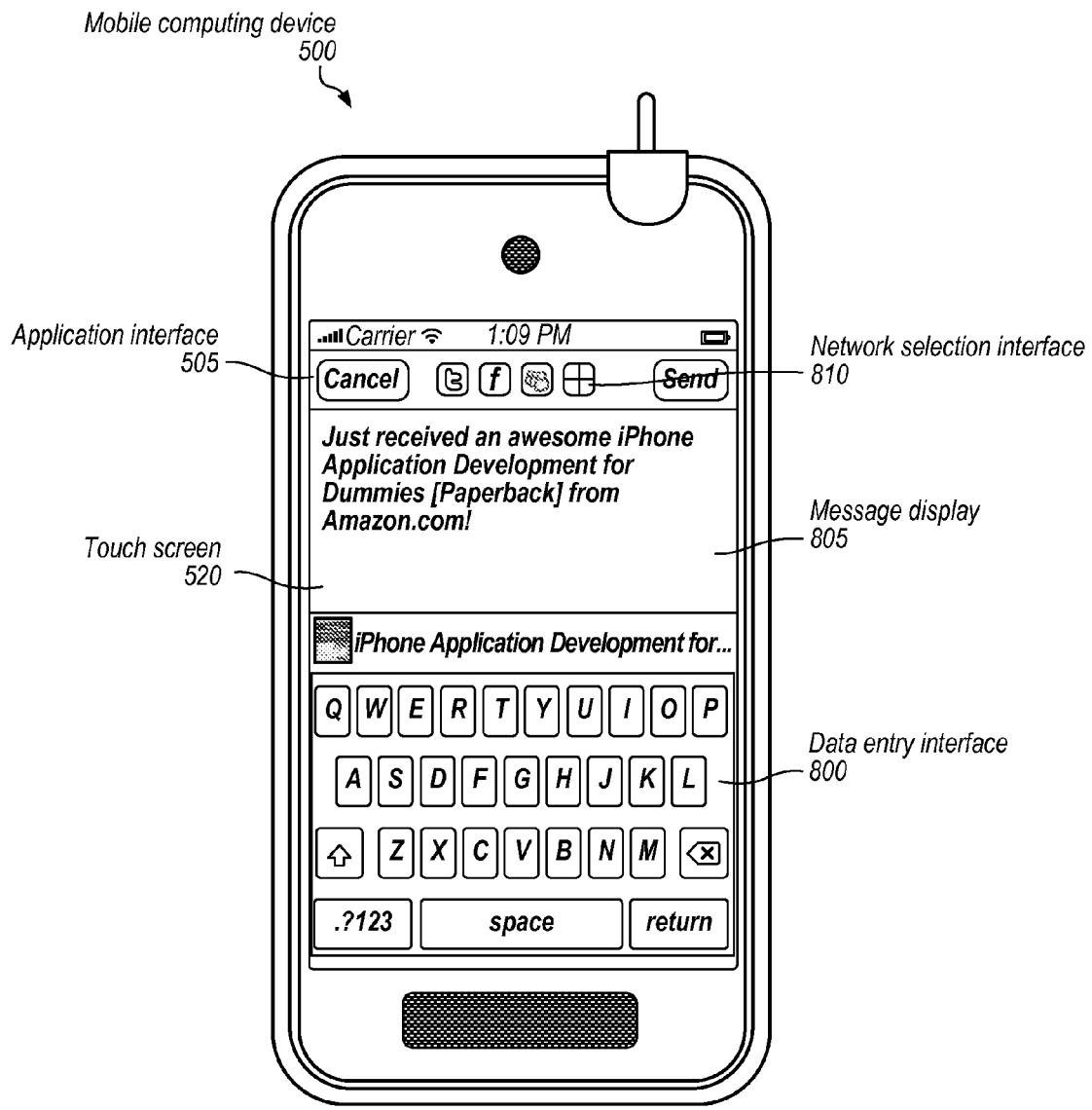
FIG. 8 is an example embodiment of a user interface of a mobile computing device for implementing transaction-related social network communication using machine-readable encoded information.

FIG. 8 is an example embodiment of a user interface of a mobile computing device for implementing transaction-related social network communication using machine-readable encoded information. Application interface 505 of mobile device 500 displays a message display 805, a network selection interface 810 and a data entry interface on touch screen 520. Message display 805 shows a message that will be sent as an update to social networks indicated through actuation of network selection interface 810. The message displayed in message display interface 805 can be the result of pre-population with a message received as transaction information from a server, or it can be populated by a user through data entry interface 800. In some embodiments, pre-populated messages displayed in message display interface 805 may be edited using data entry interface 800.

In one embodiment, mobile computing device 500 populates message display 500 from templates and addressing information for sending a social media update to a social network and sends social media updates to a server. Such templates for and addressing information for sending a social media update to a social network are, in some embodiments, stored in an application of mobile computing device. In other embodiments, templates are received from a server. Mobile computing device 500 may, in some embodiments, send a social media update directly to a social network. Social media updates may be used to inform users of a social network, which may include the customer who originally created transaction request, of the receipt of and any commentary on the received package.

Figure 9:
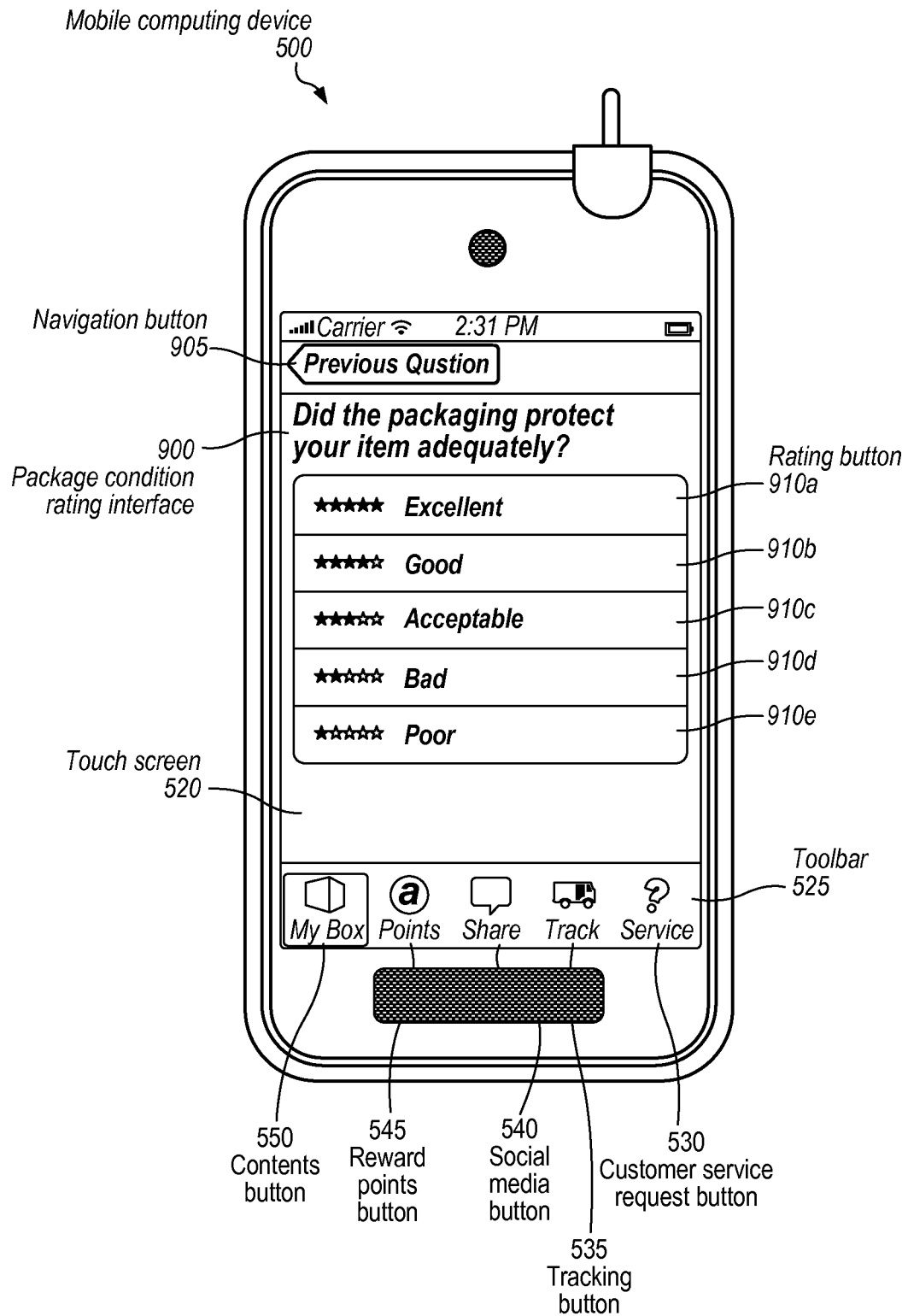
FIG. 9 is an example embodiment of a user interface of a mobile computing device for implementing transaction-related feedback communication using machine-readable encoded information.

FIG. 9 is an example embodiment of a user interface of a mobile computing device for implementing transaction-related feedback communication using machine-readable encoded information. Application interface 505 of mobile device 500 displays a package condition rating interface 900 for gathering user feedback with respect to the condition of a received package. A set of rating buttons 910a-910f allows a user to provide standardized feedback with respect to a condition of a package. A navigation button 905 allows a user to navigate between multiple questions of a multi-screen feedback program. Subsequent or previous questions can include an opportunity to photograph a physical package using a camera associated with mobile computing device or can allow for a text description of the condition of physical package. In some embodiments, audio or video feedback may be submitted. Toolbar 525 contains customer service request button 530, tracking button 535, social media button 540, reward points button 545, and contents button 550.

FIG. 10 is an example embodiment of a user interface of a mobile computing device for implementing transaction-related customer-service communication using machine-readable encoded information. Application interface 505 of mobile device 500 displays a request generation control 1000 on touch screen 520 for sending a request for customer service interaction to a server. A message display 1005 shows a message to be sent with the request for customer service interaction. In the example displayed in FIG. 10, a phone number is entered through a data entry interface 1010 for use in a request for customer service interaction. Some embodiments support entry of a text message. While the embodiment described with respect to FIG. 10 is shown as providing an interface for reporting a phone number to which a customer service contact should be directed, one of skill in the art will realize that customer service interaction request interfaces will vary between embodiments without departing from the scope and intent of the present disclosure. Specifically, interfaces in various embodiments will support customer service interaction requests in formats that include chat, SMS, and electronic mail. Additionally, in some embodiments, any of the forms of feedback discussed above, such as audio, video, text, and still images, may be supported for providing information in the context of a customer service interaction request.

The embodiments discussed above with respect to FIGS. 1A-10 provide systems and methods for transaction-related communication using machine-readable encoded information. While FIGS. 1A-1B describe systems and environments capable of supporting methods for transaction-related communication using machine-readable encoded information, one of skill in the art will readily realize, in light of having read the present disclosure, that additional systems and environments are capable of supporting embodiments within the scope and intent of this disclosure. Likewise, while FIGS. 2A-3C illustrate operations related to methods for transaction-related communication using machine-readable encoded information, one of skill in the art will readily realize, in light of having read the present disclosure, that additional operations are capable of being used to implement embodiments of transaction-related communication using machine-readable encoded information without departing from the scope and intent of this disclosure. Similarly, while FIGS. 4A-10 display respective embodiments of machine-readable encoded information and user interfaces for supporting methods for transaction-related communication using machine-readable encoded information, one of skill in the art will realize in light of having read the present disclosure that additional forms of machine-readable encoded information and additional interfaces, respectively, may be implemented in embodiments that also fall within the scope and intent of the present disclosure.

Example Computer System Embodiment

It is contemplated that in some embodiments, any of the methods, techniques or components described above may be implemented as instructions and data capable of being stored or conveyed via a computer-accessible medium. Such methods or techniques may include, for example and without limitation, the various methods of providing transaction-related communication using machine-readable encoded information, in which embodiments provide interfaces and operations for communicating information from a package recipient and associating that information with a digital representation of a transaction on the basis of information encoded in a representation accompanying a physical package. Examples, which are not intended to be limiting, include the elements and methods described above and shown in FIGS. 1A-10, or suitable variations of such elements and methods embodied as instructions. Such instructions may be executed to perform specific computational functions tailored to specific purposes (e.g., processing web services traffic, facilitating customer service interactions, etc.) as well as higher-order functions such as monitoring performance statistics for related groups of transactions or for various shipping entities, and/or any other suitable functions.

Figure 11:
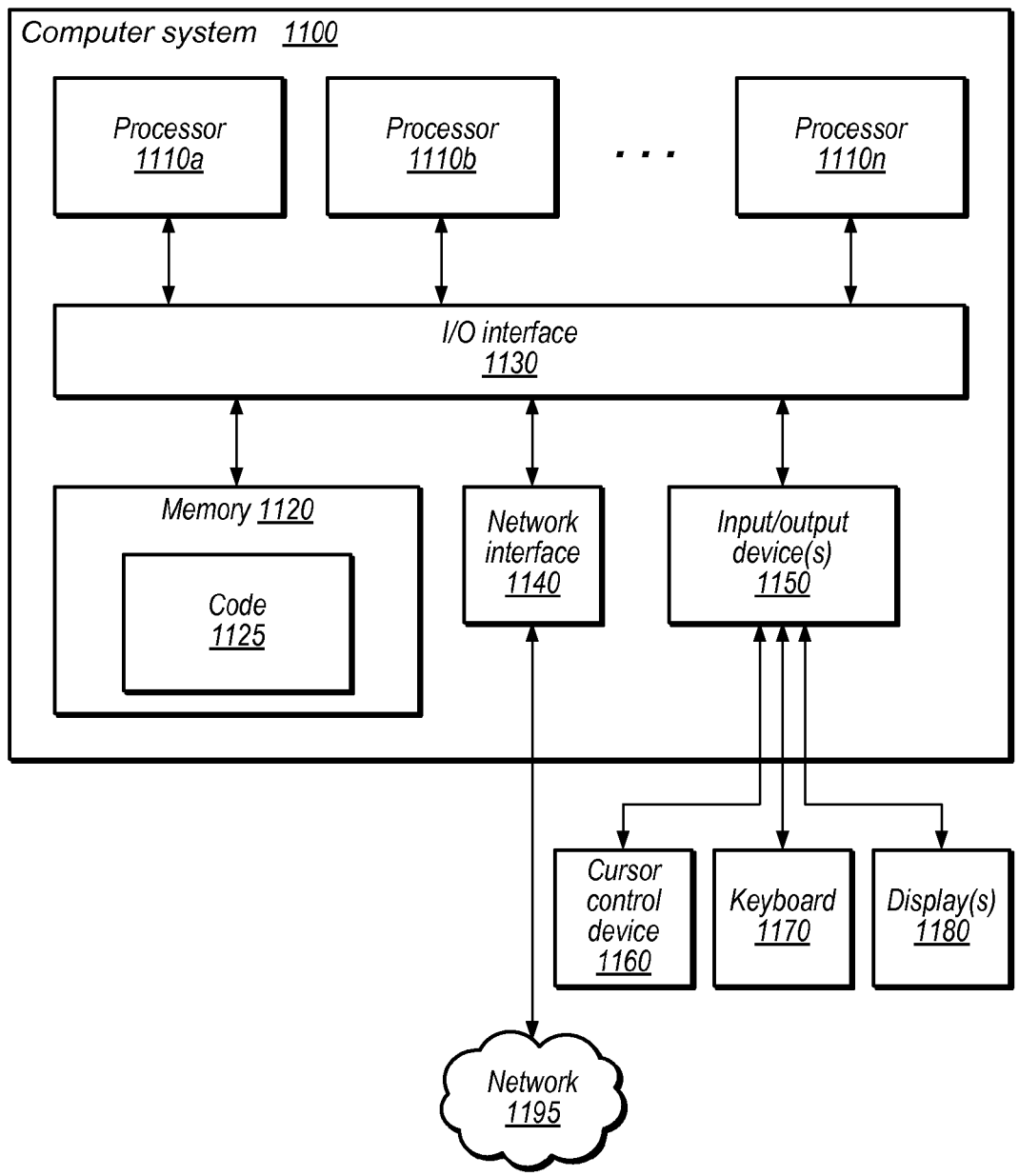
FIG. 11 is a high-level block diagram illustrating a configuration of computing system components suitable for implementing an embodiment.

One example embodiment of a computer system including computer-accessible media is illustrated in FIG. 11. Computer system 1100 may correspond to an example configuration of server 104 or mobile computing device 118 shown in FIG. 1A.

Correspondingly, in various embodiments, the functionality of any of the various modules or methods described above (e.g., as provided by transaction database 160, application interface 505, and/or other elements described above) may be implemented by one or several instances of computer system 1100. Similarly, the various elements of social network 140, customer service unit 132, network 106, wireless network 122, and other functional units may be implemented by one or several instances of computer system 1100.

In particular, it is noted that different elements of the system shown in FIG. 1 may be implemented by different computer systems 1100. In varying computing system embodiments, individual computing systems will be constructed that will omit various of the parts show in FIG. 11 and include others omitted in FIG. 11.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 1120 as code 1125. It is noted that in some embodiments, code 1125 may include instructions and data implementing desired functions that are not directly executable by processor 1110 but are represented or encoded in an abstract form that is translatable to instructions that are directly executable by processor 1110. For example, code 1125 may include instructions specified in an ISA that may be emulated by processor 1110, or by other code 1125 executable on processor 1110. Alternatively, code 1125 may include instructions, procedures or statements implemented in an abstract programming language that may be compiled or interpreted in the course of execution. As non-limiting examples, code 1125 may include code specified in a procedural or object-oriented programming language such as C or C++, a scripting language such as perl, a markup language such as HTML or XML, or any other suitable language.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to network 106, such as other computer systems, for example. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1120 may be one embodiment of a computer-accessible storage medium configured to store instructions and data as described above. However, in other embodiments, instructions and/or data may be received, sent or stored upon different types of computer-accessible storage media. Generally speaking, a computer-accessible storage medium may include storage media or memory media such as magnetic or optical media, e.g., disk or CD/DVD-ROM coupled to computer system 1100 via I/O interface 1130. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 1100 as system memory 1120 or another type of memory. A computer-accessible storage medium may generally be accessible via transmission media or signals such as electrical, electromagnetic, or digital signals, conveyed via a communication medium such as a network and/or a wireless link, such as may be implemented via network interface 1140.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    generating, by a computer, encoded information to associate a physical package to
    a transaction, wherein
    the transaction comprises an order for one or more items to be shipped in the physical package;
    providing the encoded information for inclusion in a machine-readable representation of the encoded information for shipping with the physical package;
    subsequent to delivery of the physical package to a recipient, receiving over a network recipient reaction information containing the encoded information obtained from the machine-readable representation;
    using the encoded information to associate the recipient reaction information to a record for the transaction; and
    responsive to the computer receiving over the network recipient reaction information from a mobile device, sending over the network to the mobile device a video message associated with the record by a sender of the package.

2. The method of claim 1, further comprising sending an item of transaction information associated with the record.

3. The method of claim 2, wherein the item of transaction information comprises a data structure indicating contents of the physical package.

4. The method of claim 2, wherein the item of transaction information comprises a message from a user to the recipient.

5. The method of claim 2, wherein the item of transaction information comprises a template for creating a social media update comprising information related to the delivery of the physical package to the recipient.

6. The method of claim 1, wherein the recipient reaction information comprises a request for customer service contact.

7. The method of claim 1, wherein the recipient reaction information comprises a picture of the physical package taken using the handheld communication device.

8. The method of claim 1, further comprising calculating transaction performance statistics based in part upon the recipient reaction information.

9. The method of claim 1, wherein the providing the encoded information for inclusion in the machine-readable representation of the encoded information further comprises providing the encoded information for inclusion in a radio frequency identification representation of the encoded information.

10. The method of claim 1, wherein the receiving over the network the recipient reaction information further comprises receiving an indication of recipient satisfaction.

11. The method of claim 10, wherein the receiving over the network the recipient reaction information further comprises receiving an indication of recipient satisfaction with respect to the condition of the physical package at receipt.

12. A non-transitory computer-readable storage medium storing program instructions that when executed cause a server to implement a transaction-related communication system, wherein the transaction-related communication system comprises:
- an encoded information generation function for generating, on a server, encoded information to associate a physical package to a transaction, wherein
  - the transaction comprises an order for one or more items to be shipped in the package;
- a transmission function for providing the encoded information for inclusion in an optically scannable machine-readable representation of the encoded information for shipping with the physical package;
- a receipt function for, subsequent to delivery of the physical package to a recipient, receiving over a network from a mobile device recipient reaction information containing the encoded information obtained from the optically scannable machine-readable representation;
- an associating function for using the encoded information to associate the recipient reaction information to a record for the transaction; and
- a transaction information delivery function for, responsive to the server receiving over the network recipient reaction information from the mobile device, sending over the network to the mobile device a video message associated with the record by a sender of the package.

13. The non-transitory computer-readable storage medium of claim 12, wherein the transaction-related communication system further comprises a statistical analysis module for calculating transaction performance statistics based in part upon the recipient reaction information, wherein the transaction performance statistics comprise comparative damage statistics for comparing shippers of physical packages for frequency of complaints with respect to damage.

14. The non-transitory computer-readable storage medium of claim 12, wherein the optically scannable machine-readable representation of the encoded information comprises a first QR code for indicating satisfaction with a transaction and a second QR code for indicating dissatisfaction.

15. The non-transitory computer-readable storage medium of claim 12, wherein the wherein the transaction-related communication system further comprises a transaction information delivery function for sending an item of transaction information associated with the record.

16. The non-transitory computer-readable storage medium of claim 15, wherein the transaction information delivery function is configured for sending to the recipient an item of documentation with respect to an item contained within the physical package.

17. The non-transitory computer-readable storage medium of claim 15, wherein the transaction information delivery function is configured for sending to the recipient a video greeting message prepared by a purchaser of an item in the physical package.

18. The non-transitory computer-readable storage medium of claim 12, wherein the transaction-related communication system further comprises a user authentication module for performing security functions.

19. The non-transitory computer-readable storage medium of claim 12, wherein the encoded information to associate a physical package to a transaction comprises a URL for communicating with a server executing the transaction-related communication system.

20. A system, comprising:
- one or more computers configured to implement a transaction-related communication system, wherein the transaction-related communication system comprises:
  - an encoded information generation function for generating, on a server, encoded information to associate a physical package to a transaction, wherein the transaction comprises an order for one or more items to be shipped in the package;
  - a transmission function for providing the encoded information for inclusion in a machine-readable representation of the encoded information for shipping with the physical package;
  - a receipt function for, subsequent to delivery of the physical package to a recipient, receiving over a network recipient reaction information containing the encoded information obtained from the optically scannable machine-readable representation;
  - an associating function for using the encoded information to associate the recipient reaction information to a record for the transaction; and
  - a transaction information delivery function for, responsive to the server receiving over the network recipient reaction information from a mobile device, sending over the network to the mobile device a video message associated with the record by a sender of the package.

21. The system of claim 20, wherein the transaction-related communication system further comprises a customer service interaction request function for alerting a customer service unit to a request for a customer service interaction and to provide the customer service unit with the recipient reaction information and the record for the transaction.

22. The system of claim 20, wherein the transaction-related communication system further comprises a social media update function for transmitting to a social network a social media update comprising information about the transaction.

23. The system of claim 22, wherein the social media update function transmits to a social network a social media update indicating participation in a reward program that awards recognition on a social network.

24. The system of claim 22, wherein the social media update function transmits to a social network a social media update comprising feedback responsive to a product.

25. The system of claim 20, wherein the transaction information delivery function is further configured to deliver a suggestion that the recipient purchase a second product on the basis of having received a first product.

26. The system of claim 20, wherein the transaction-related communication system further comprises a delivery schedule adjustment function for adjusting delivery estimates in response to recipient reaction information.

27. The system of claim 20, wherein the transaction information delivery function is further configured to deliver a discount notification to a recipient of a product.

28. The system of claim 20, wherein the transaction information delivery function is further configured to deliver assistance with a return of merchandise.

29. The system of claim 20, wherein the encoded information includes a listing of the contents of the physical package.

* * * * *